(12) United States Patent
Masamura

(10) Patent No.: US 11,115,589 B2
(45) Date of Patent: Sep. 7, 2021

(54) IMAGING CONTROL APPARATUS AND METHOD FOR CONTROLLING IMAGING CONTROL APPARATUS

(71) Applicant: CANON KABUSHIKI KAISHA, Tokyo (JP)

(72) Inventor: Takuya Masamura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 72 days.

(21) Appl. No.: 16/397,952

(22) Filed: Apr. 29, 2019

(65) Prior Publication Data

US 2019/0349522 A1 Nov. 14, 2019

(30) Foreign Application Priority Data

May 9, 2018 (JP) .............................. JP2018-090469

(51) Int. Cl.
H04N 5/222 (2006.01)
H04N 5/232 (2006.01)
H04N 21/422 (2011.01)

(52) U.S. Cl.
CPC ..... H04N 5/23229 (2013.01); H04N 5/23212 (2013.01); H04N 5/23238 (2013.01); H04N 21/42208 (2013.01)

(58) Field of Classification Search
CPC ........... H04N 5/23229; H04N 5/23212; H04N 5/23238; H04N 5/23222; H04N 5/23216; H04N 5/232939; H04N 5/23225; H04N 5/23245; H04N 5/144; H04N 5/265; H04N 21/42208
See application file for complete search history.

(56) References Cited

U.S. PATENT DOCUMENTS

| 2012/0188332 | A1* | 7/2012 | Yamaguchi | ........ | H04N 5/23293 |
| | | | | | 348/36 |
| 2014/0300688 | A1 | 10/2014 | Shin | | |
| 2016/0050368 | A1* | 2/2016 | Seo | .......... | G06T 7/194 |
| | | | | | 348/36 |

(Continued)

FOREIGN PATENT DOCUMENTS

| CN | 101964869 A | 2/2011 |
| CN | 102045501 A | 5/2011 |

(Continued)

Primary Examiner — Kelly L Jerabek
(74) Attorney, Agent, or Firm — Canon U.S.A., Inc. IP Division

(57) ABSTRACT

A generation unit configured to generate a combined image obtained by combining an image captured in a case where an image capturing direction is moved in a first direction from an image capturing start, and an image captured in a case where the image capturing direction is moved in a second direction opposite to the first direction with respect to a position of the image capturing start, and a recording control unit configured to perform control to, in a case where the image capturing direction is moved in the first direction before the image capturing direction is moved in the second direction, then according to an end condition for ending image capturing being satisfied, record the combined image obtained by the generation unit combining the image captured in the case where the image capturing direction is moved in the first direction are included.

26 Claims, 12 Drawing Sheets

(56) References Cited

U.S. PATENT DOCUMENTS

2017/0154453 A1 6/2017 Yasutomi
2017/0221244 A1* 8/2017 Hiraga ............... H04N 5/23238

FOREIGN PATENT DOCUMENTS

| | | | |
|---|---|---|---|
| CN | 102098438 | A | 6/2011 |
| CN | 102158646 | A | 8/2011 |
| CN | 102348065 | A | 2/2012 |
| CN | 102469261 | A | 5/2012 |
| CN | 102917167 | A | 2/2013 |
| CN | 104995558 | A | 10/2015 |
| CN | 106210539 | A | 12/2016 |
| CN | 106605403 | A | 4/2017 |
| CN | 106851117 | A | 6/2017 |
| JP | 2010-28764 | A | 2/2010 |
| JP | 2014-066958 | A | 4/2014 |
| JP | 2017-139759 | A | 8/2017 |
| WO | 2011/078066 | A1 | 6/2011 |

* cited by examiner

IMAGING CONTROL APPARATUS AND METHOD FOR CONTROLLING IMAGING CONTROL APPARATUS

BACKGROUND OF THE INVENTION

Field of the Invention

The aspect of the embodiments relates to an imaging control apparatus for performing panoramic image capturing.

Description of the Related Art

Japanese Patent Application Laid-Open No. 2010-28764 discusses a technique for continuously capturing still images while swinging an imaging apparatus in one direction, and for combining a plurality of obtained still images into a panoramic image.

Japanese Patent Application Laid-Open No. 2017-139759 discusses a technique for capturing an image of an object such as the face of a person, then continuously capturing still images while swinging a camera in right and left directions with respect to the object, and combining a plurality of still images obtained with the object at the center into a panoramic image.

Japanese Patent Application Laid-Open No. 2010-28764 and Japanese Patent Application Laid-Open No. 2017-139759, however, have an issue that panoramic image capturing can be performed only by either the technique for swinging the imaging apparatus in one direction or the technique for swinging the camera in the left and right directions. Meanwhile, if Japanese Patent Application Laid-Open No. 2010-28764 and Japanese Patent Application Laid-Open No. 2017-139759 are simply combined, which of the technique for swinging the imaging apparatus in one direction and the technique for swinging the camera in both directions is used to perform panoramic image capturing is set in advance.

SUMMARY OF THE INVENTION

According to an aspect of the embodiments, an apparatus includes at least one processor and at least one memory coupled to the at least one processor, the memory having instructions that, when executed by the processor, performs operations as a generation unit configured to generate a combined image obtained by combining an image captured in a case where an image capturing direction is moved in a first direction from an image capturing start, and an image captured in a case where the image capturing direction is moved in a second direction opposite to the first direction with respect to a position of the image capturing start, and a recording control unit configured to perform control to, in a case where the image capturing direction is moved in the first direction before the image capturing direction is moved in the second direction, then according to an end condition for ending image capturing being satisfied, record the combined image obtained by the generation unit combining the image captured in the case where the image capturing direction is moved in the first direction.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings.

It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

The present exemplary embodiment is described using as an example a case where an imaging control apparatus is a digital camera.

Figure 1:
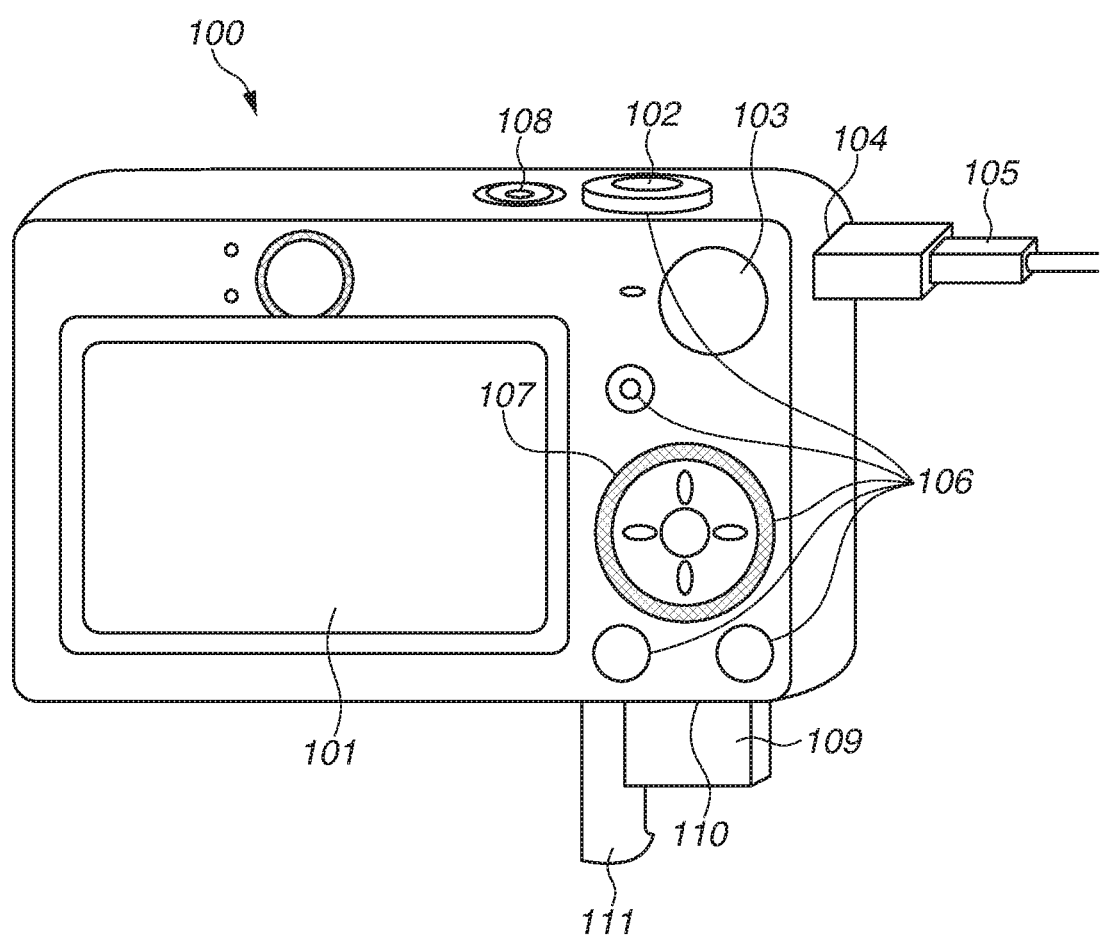
FIG. 1 is a diagram illustrating an example of an external configuration of a camera.

FIG. 1 is an external perspective view of a digital camera 100 (hereinafter referred to as a "camera 100") as viewed from its back side.

A display unit 101 displays an image and various pieces of information. The display unit 101 corresponds to an example of a display unit. A shutter button 102 is an operation unit for a user to give an image capturing instruction. A mode selection switch 103 is an operation unit for switching various modes. A connector 104 is a connection portion for connecting a connection cable 105 for connecting to an external device such as a personal computer (PC) or a printer.

An operation unit 106 receives various operations from the user. The operation unit 106 includes operation members such as various switches, buttons, a controller wheel 107, and a touch panel. The controller wheel 107 is an operation member included in the operation unit 106 and capable of being rotationally operated. A power switch 108 is a push button for switching the turning on and off of the camera 100. A recording medium 109 is a memory card or a hard disk. A recording medium slot 110 stores the recording medium 109. The recording medium 109 stored in the recording medium slot 110 can communicate with the camera 100 and can record or reproduce image data. The recording medium slot 110 is closed by a cover 111. FIG. 1 illustrates the state where the cover 111 is opened, the recording medium 109 is taken out of the recording medium slot 110, and a part of the recording medium 109 is exposed.

Figure 2:
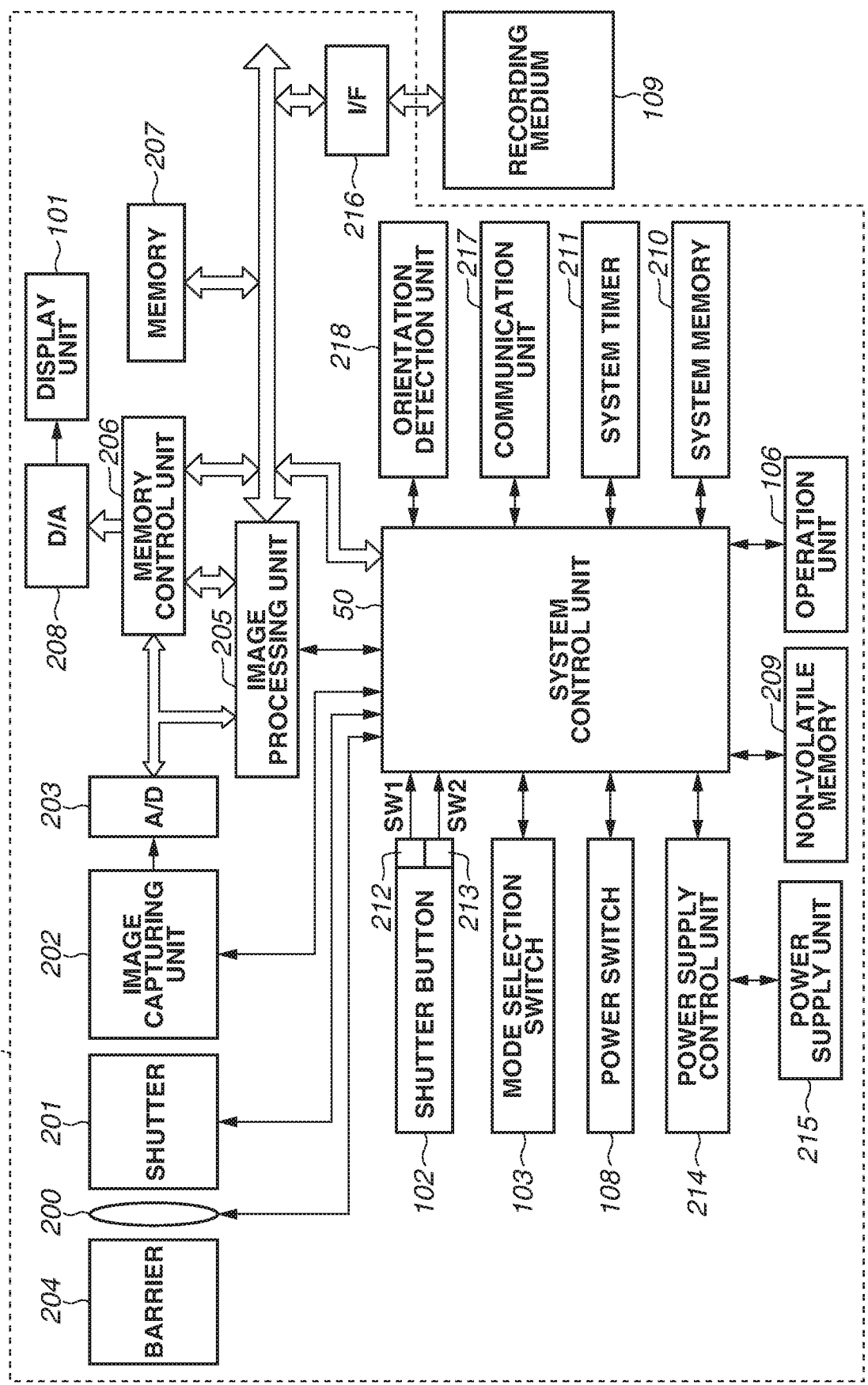
FIG. 2 is a diagram illustrating an example of an internal configuration of the camera.

FIG. 2 is a diagram illustrating an example of the configuration of the camera 100. The same components as those in FIG. 1 are designated by the same signs, and the description of these components is appropriately omitted.

An imaging lens 200 is a lens group including a zoom lens and a focus lens. A shutter 201 has an aperture function. An image capturing unit 202 is an image sensor including a charge-coupled device (CCD) or a complementary metal-oxide-semiconductor (CMOS) device, which converts an optical image into an electric signal. The image capturing unit 202 corresponds to an example of an image capturing unit. An analog-to-digital (A/D) converter 203 converts an analog signal output from the image capturing unit 202 into a digital signal. A barrier 204 covers the imaging lens 200, thereby preventing stains on and breakage of the imaging system including the imaging lens 200, the shutter 201, and the image capturing unit 202.

An image processing unit 205 performs various types of image processing based on control of the system control unit 50. That is, the image processing unit 205 performs resizing processes, such as predetermined pixel interpolation and reduction, and a color conversion process on image data from the A/D converter 203 or image data from a memory control unit 206. Further, the image processing unit 205 performs a predetermined calculation process using captured image data. Then, the system control unit 50 performs exposure control and distance measurement control based on the obtained calculation result. In this manner, an autofocus (AF) process, an automatic exposure (AE) process, and a pre-flash (EF) process are performed by a through-the-lens (TTL) method. Further, the image processing unit 205 performs a predetermined calculation process using captured image data and performs an auto white balance (AWB) process by the TTL method based on the obtained calculation result.

Image data from the A/D converter 203 is written directly to a memory 207 via the image processing unit 205 and the memory control unit 206 or via the memory control unit 206. The memory 207 stores image data obtained by the image capturing unit 202 and converted into digital data by the A/D converter 203 and image data to be displayed on the display unit 101. The memory 207 includes a sufficient storage capacity for storing a predetermined number of still images, and a moving image and a sound of a predetermined length of time. Further, the memory 207 doubles as a memory for image display (a video memory).

A digital-to-analog (D/A) converter 208 converts image data for display stored in the memory 207 into an analog signal and supplies the analog signal to the display unit 101. Thus, the image data for display written in the memory 207 is displayed on the display unit 101 via the D/A converter 208. The display unit 101 performs display on a display device such as a liquid crystal display (LCD) based on an analog signal from the D/A converter 208. Analog signals are once converted into digital signals by the A/D converter 203, and the digital signals are accumulated in the memory 207 and converted into analog signals by the D/A converter 208. Then, the analog signals are sequentially transferred to and displayed at the display unit 101, thereby displaying a live view image (an LV image). Thus, the display unit 101 functions as an electronic viewfinder.

A non-volatile memory 209 is an electrically erasable and recordable memory as a recording medium and is, for example, an electrically erasable programmable read-only memory (EEPROM). The non-volatile memory 209 stores a constant for the operation of the system control unit 50 and a program. The program is a computer program for executing flow charts described below in the present exemplary embodiment.

The system control unit 50 is at least one processor including a circuit and controls the entirety of the camera 100. The system control unit 50 corresponds to examples of a generation unit, a recording control unit, and a display control unit. The system control unit 50 executes a program stored in the non-volatile memory 209, thereby achieving processes described below in the present exemplary embodiment. Furthermore, the system control unit 50 controls the memory 207, the D/A converter 208, and the display unit 101, thereby also performing display control.

A system memory 210 is, for example, a random-access memory (RAM). A constant or a variable for the operation of the system control unit 50 and a program read from the non-volatile memory 209 are loaded into the system memory 210. A system timer 211 is a time measurement unit for measuring the time used for various types of control or the time of a built-in clock.

The mode selection switch 103, a first shutter switch 212, a second shutter switch 213, and the operation unit 106 are operation units for inputting various operation instructions to the system control unit 50.

The mode selection switch 103 is used to switch an operation mode to any one of a still image capturing mode, a moving image capturing mode, and a reproduction mode. The system control unit 50 sets the operation mode switched using the mode selection switch 103. The still image capturing mode includes an auto image capturing mode, an auto scene distinction mode, a manual mode, a stop priority mode (an Av mode), a shutter speed priority mode (a Tv mode), a program AE mode, and a panoramic image capturing mode. Further, the still image capturing mode includes various scene modes in which image capturing settings are made depending on image capturing scenes, and a custom mode. Using the mode selection switch 103, the user can directly switch to any one of the above modes. Alternatively, using the mode selection switch 103, the user may once switch to a list screen of image capturing modes, then select any one of a plurality of modes displayed on the list screen, and switch to the selected mode using another operation member. Similarly, the moving image capturing mode may also include a plurality of modes.

The first shutter switch 212 is turned on in an intermediate state of an operation, i.e., by a so-called half press (an image capturing preparation instruction), of the shutter button 102 provided in the camera 100 and generates a first shutter switch signal SW1. Based on the first shutter switch signal SW1, an image capturing preparation process such as the operation of an AF process, an AE process, an AWB process, or an EF process is started.

The second shutter switch 213 is turned on by the completion of an operation, i.e., by a so-called full press (an image capturing instruction), of the shutter button 102 and generates a second shutter switch signal SW2. Based on the second shutter switch signal SW2, the system control unit 50 starts a series of operations of an image capturing process from the reading of a signal from the image capturing unit 202 to the writing of image data to the recording medium 109.

The operation members of the operation unit 106 are appropriately assigned functions for corresponding scenes by performing the operation of selecting various function icons displayed at the display unit 101 and act as various function buttons. The function buttons include, for example, an end button, a return button, an image feeding button, a jump button, a narrowing-down button, and an attribute change button. For example, if a menu button is pressed, a menu screen where various settings can be made is displayed at the display unit 101. The user can intuitively make various settings using the menu screen displayed at the display unit 101, a four-directional button for up, down, left, and right directions, and a set button. The operation unit 106 includes the controller wheel 107. The controller wheel 107 is an operation member included in the operation unit 106 and capable of being rotationally operated. The controller wheel 107 is used together with the directional button to indicate a selection item.

A power supply control unit 214 includes a battery detection circuit, a direct-current-to-direct-current (DC/DC) converter, and a switch circuit for switching blocks to which to apply a current. The power supply control unit 214 detects the presence or absence of attachment of a battery, the type of a battery, and the remaining life of a battery. Furthermore, the power supply control unit 214 controls the DC/DC converter based on the detection results and an instruction from the system control unit 50 and supplies a required voltage to the components including the recording medium 109 for a required period. A power supply unit 215 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter. A recording medium interface (I/F) 216 is an interface with the recording medium 109. The recording medium 109 is composed of a semiconductor memory, an optical disc, or a magnetic disk.

A communication unit 217 connects to an external device wirelessly or via a cable for a wired connection, and transmits and receives a video signal or a sound signal to and from the external device. The communication unit 217 can connect to a wireless local area network (LAN) or the Internet. Further, the communication unit 217 can communicate with the external device also using Bluetooth (registered trademark) or Bluetooth Low Energy. The communication unit 217 can transmit an image (including a live view image) captured by the image capturing unit 202 or image data stored in the storage medium 109, or receive image data or various other pieces of information from the external device.

An orientation detection unit 218 detects the orientation of the camera 100 relative to the direction of gravity. Based on orientation information detected by the orientation detection unit 218, the system control unit 50 can determine whether an image captured by the image capturing unit 202 is an image captured when the camera 100 is held horizontally or an image captured when the camera 100 is held vertically. The system control unit 50 can add direction information based on the orientation detected by the orientation detection unit 218 to an image file of data on an image captured by the image capturing unit 202 or store image data by rotating the image data based on the orientation detected by the orientation detection unit 218. Based on the orientation information detected by the orientation detection unit 218, the system control unit 50 can also detect the motion of the camera 100 (whether the camera 100 is panned, tilted, lifted, or at rest). The orientation detection unit 218 can use either or both of an acceleration sensor and a gyro sensor. The gyro sensor detects the two-axial or three-axial angular velocity of the rotation of the camera 100.

Figure 3:
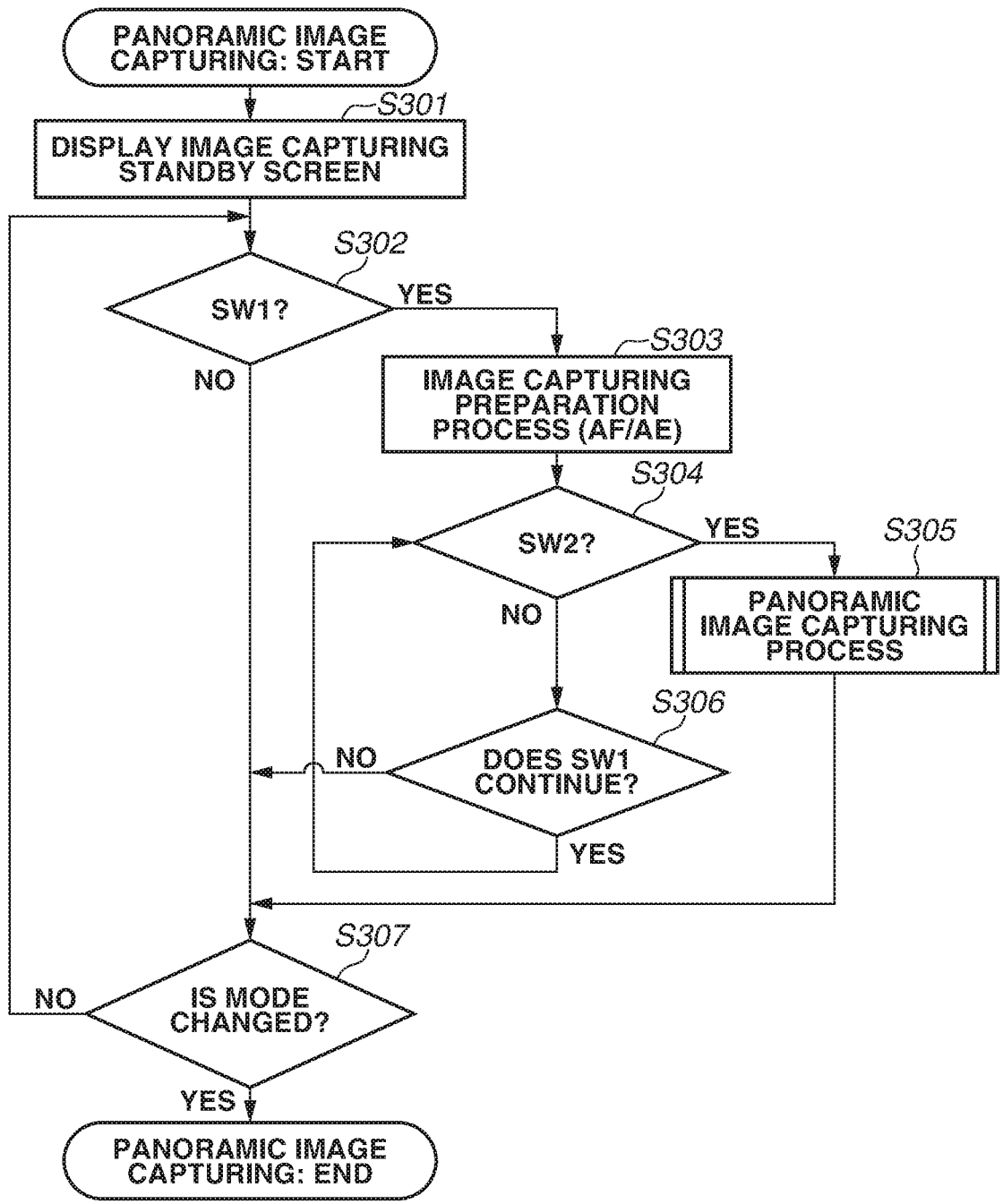
FIG. 3 is a flowchart illustrating an example of processing in a panoramic image capturing mode.

Next, with reference to a flowchart in FIG. 3, processing in the panoramic image capturing mode of the camera 100 according to the present exemplary embodiment will be described. Processes in the flowchart in FIG. 3 are achieved by the system control unit 50 loading a program stored in the non-volatile memory 209 into the system memory 210 and executing the program. Further, the flowchart in FIG. 3 is started by the user operating the mode selection switch 103 to set the panoramic image capturing mode. The panoramic image capturing mode includes the mode of capturing images while swinging the camera 100 in a horizontal direction and the mode of capturing images while swinging the camera 100 in a vertical direction. The mode of capturing images while swinging the camera 100 in the horizontal direction will be described below. A "swing" includes both the movements (motions) of translating the camera 100 and rotationally moving the camera 100. For example, swinging the camera 100 from left to right includes changing the image capturing range by moving the camera 100 from left to right in the horizontal direction without rotating the camera 100. Swinging the camera 100 from left to right includes changing the image capturing range by rotating (rotationally moving) the camera 100 such that the image capturing direction rotates clockwise, without moving the rotational axis of the camera 100.

In step S301, the system control unit 50 displays an image capturing standby screen in the panoramic image capturing mode at the display unit 101.

Figure 4:
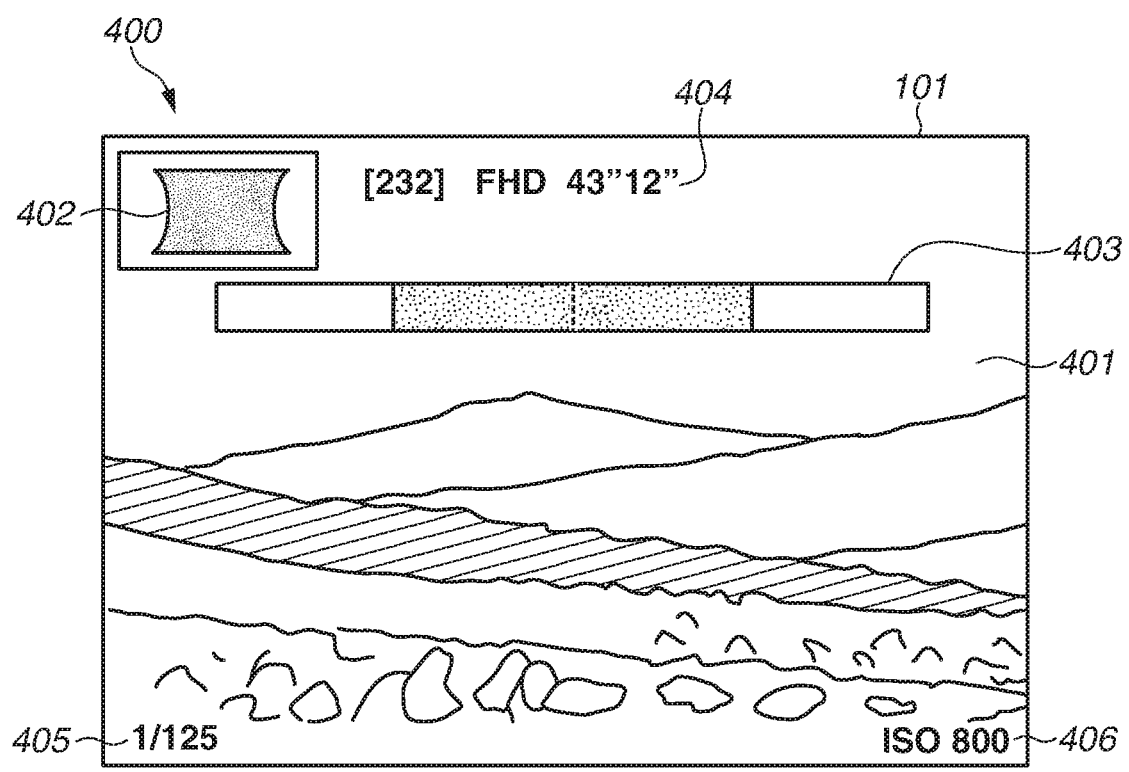
FIG. 4 is a diagram illustrating an example of an image capturing standby screen.

FIG. 4 is a diagram illustrating an example of an image capturing standby screen 400.

On the image capturing standby screen 400, a live view image 401, a mode icon 402, a progress bar 403, and image capturing setting items 404 to 406 are displayed.

The live view image 401 is image data that is being captured by the image capturing unit 202. The mode icon 402 is a display item indicating that the current image capturing mode is the panoramic image capturing mode. The progress bar 403 is a display item for guiding the progress of panoramic image capturing. The progress bar 403 displays an image-capturing-possible range where an image used for a panoramic image can be captured. The image capturing setting items 404 to 406 are items for displaying parameters regarding image capturing set for the camera 100.

The user adjusts the image capturing direction and the angle of view while confirming the live view image 401 on the image capturing standby screen 400. In the panoramic image capturing mode, the user directs the image capturing direction of the camera 100 to particularly a main object among objects in a wide range and then presses the shutter button 102.

In step S302, the system control unit 50 determines whether the shutter button 102 is half-pressed, i.e., whether the first shutter switch 212 is turned on. If the first shutter switch 212 is turned on (Yes in step S302), the processing proceeds to step S303. If not (No in step S302), the processing proceeds to step S307.

In step S303, the system control unit 50 performs an image capturing preparation process such as an AF process or an AE process.

In step S304, the system control unit 50 determines whether the shutter button 102 is full-pressed, i.e., whether the second shutter switch 212 is turned on. If the second shutter switch 212 is turned on (Yes in step S304), the processing proceeds to step S305. If not (No in step S304), the processing proceeds to step S306.

In step S305, the system control unit 50 controls the image capturing unit 202 and the image processing unit 205 to perform a panoramic image capturing process. In the panoramic image capturing process, the system control unit 50 can generate a combined image by combining an image captured when as to the image capturing direction the user swings the camera in a first direction from an image capturing start, and an image captured when as to the image capturing direction the user swings the camera in a second direction opposite to the first direction with respect to the position of the image capturing start. Such a combined image is a vertically long or horizontally long panoramic image. The details of the panoramic image capturing process will be described below in exemplary embodiments.

In step S306, the system control unit 50 determines whether the shutter button 102 continues to be half-pressed, i.e., whether the first shutter switch 212 continues to be on. If the first shutter switch 212 continues to be on (Yes in step S306), the processing returns to step S304. If not (No in step S306), the processing proceeds to step S307.

In step S307, the system control unit 50 determines whether the image capturing mode is changed using the mode selection switch 103. If the image capturing mode is changed (Yes in step S307), the panoramic image capturing mode is ended. If not (No in step S307), the processing proceeds to step S302. In step S302, the system control unit 50 returns to the panoramic image capturing standby state.

With reference to FIGS. 5 to 12E, operations according to exemplary embodiments will be described below.

Figure 5:
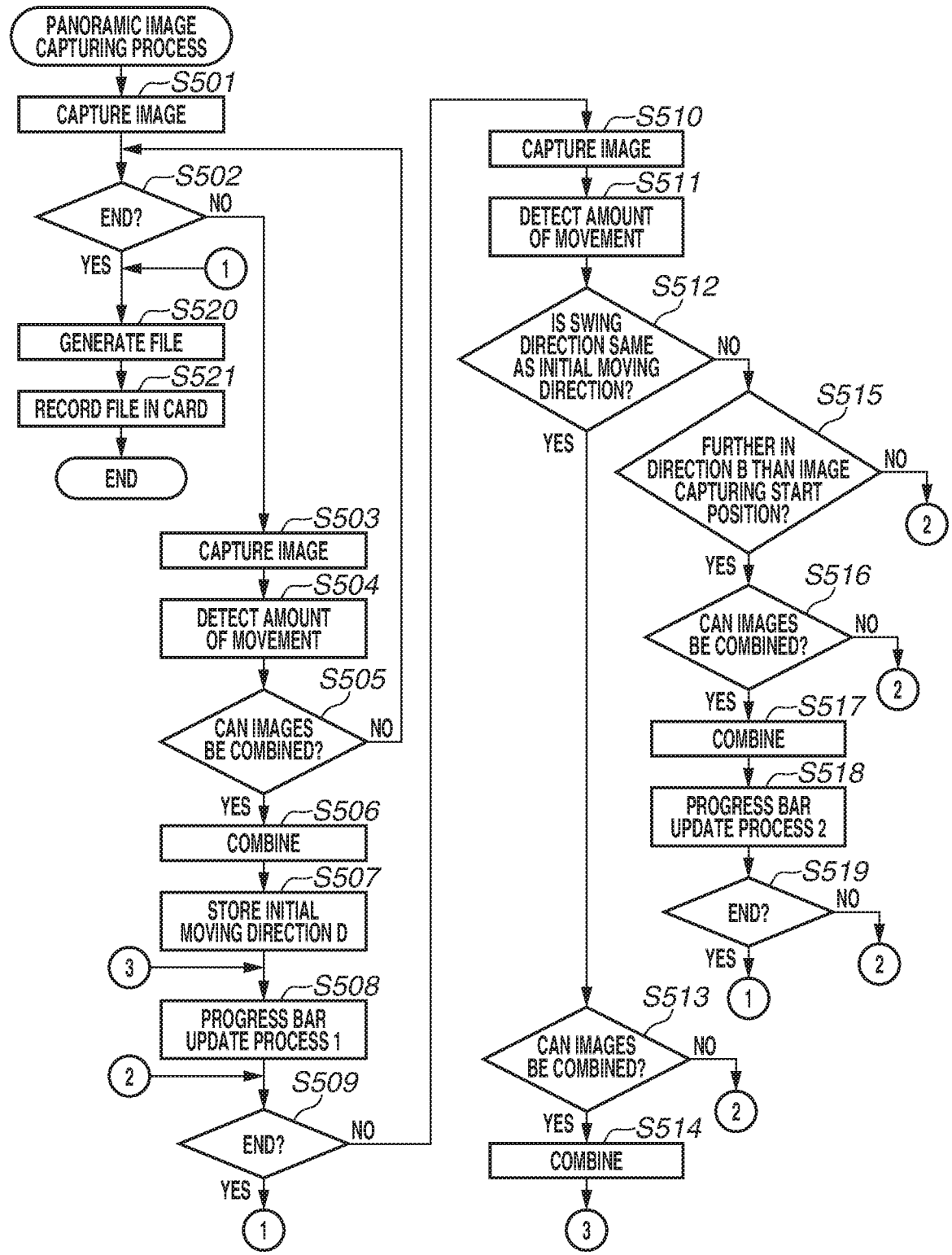
FIG. 5 is a flowchart illustrating an example of a panoramic image capturing process.

First, with reference to a flowchart in FIG. 5 and progress bars illustrated in FIGS. 6A to 6E and 7A to 7E and displayed during panoramic image capturing, the panoramic image capturing process in step S305 in FIG. 3 is described in detail. Processes in the flowchart in FIG. 5 are achieved by the system control unit 50 loading a program stored in the non-volatile memory 209 into the system memory 210 and executing the program.

First, as the detailed description of the progress bar 403 in FIG. 4, progress bars 600 and 700 illustrated in FIGS. 6A to 6E and 7A to 7E are described. FIGS. 6A to 6E are a first example of display of the progress bar 403 in FIG. 4. FIGS. 7A to 7E are a second example of display of the progress bar 403 in FIG. 4 as an example different from the first example of display illustrated in FIGS. 6A to 6E.

An area 601 in FIGS. 6A and 7A indicates a swing-possible range (hereinafter referred to as a "swing-possible range 601"). When panoramic image capturing is started, the swing-possible range 601 is displayed bilaterally equally or bilaterally symmetrically with respect to a dotted line 602. The swing-possible range 601 indicates the range where the camera 100 should be swung to obtain a panoramic image in only one direction. Each of the lengths in the left-right direction of the swing-possible range 601 from the dotted line 602 can correspond to the capacity of the storage area of a buffer for a single panoramic image prepared in the memory 207. Each of the lengths in the left-right direction of the swing-possible range 601 from the dotted line 602 may be stored in the non-volatile memory 209 in advance. In a case where the length at which a panoramic image can be captured can be selected, these lengths are set to lengths based on the selection.

The dotted line 602 in FIGS. 6A and 7A indicates an image capturing start position (hereinafter referred to as an "image capturing start position 602") of the panoramic image capturing.

An area 603 in FIG. 6A indicates an assumed combined range (hereinafter referred to as an "assumed combined range 603") to be ultimately combined into a panoramic image. The assumed combined range 603 corresponds to an example of display indicating an entirety of an amount of movement by which a camera is swung when panoramic image capturing is performed. When the panoramic image capturing is started, the assumed combined range 603 is displayed bilaterally equally with respect to the image capturing start position 602. That is, the assumed combined range 603 in FIG. 6A indicates the range where the camera 100 should be swung to obtain a panoramic image having bilaterally equal widths with respect to the image capturing start position 602 in a case where the camera 100 is swung by the maximum swing-possible amount. The lengths in the left-right direction of the assumed combined range 603 can correspond to the capacity of the storage area of the buffer for a single panoramic image prepared in the memory 207. The lengths in the left-right direction of the assumed combined range 603 may be stored in the non-volatile memory 209 in advance. In a case where the length at which a panoramic image can be captured can be selected, these lengths are set to lengths based on the selection.

A solid line 604 in FIG. 6A indicates the boundary (hereinafter referred to as a "boundary 604") between the swing-possible range 601 and the assumed combined range 603. The boundary 604 corresponds to an example of display indicating a position where a swing direction is turned back to obtain a panoramic image having bilaterally equal widths with respect to the image capturing start position 602.

An area 605 in FIGS. 6B and 7B indicates a combining-completed range (hereinafter referred to as a "combining-completed range 605") combined into a panoramic image after the panoramic image capturing is started.

An area 606 in FIGS. 6B and 7B indicates a swing-impossible range (hereinafter referred to as a "swing-impossible range 606") where the camera 100 cannot be swung according to the combining-completed range 605. The swing-impossible range 606 corresponds to an example of a movement-impossible range.

The swing-possible range 601, the assumed combined range 603, the combining-completed range 605, and the swing-impossible range 606 are displayed by a display method using different colors, patterns, or oblique lines.

Figure 6A:
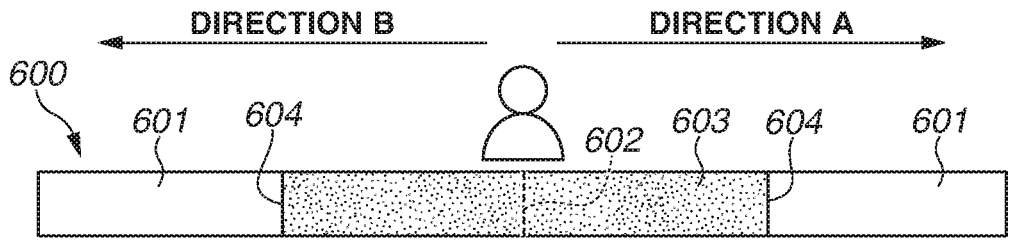
FIGS. 6A to 6E are diagrams illustrating an example of a progress bar according to a first exemplary embodiment.
Figure 7A:
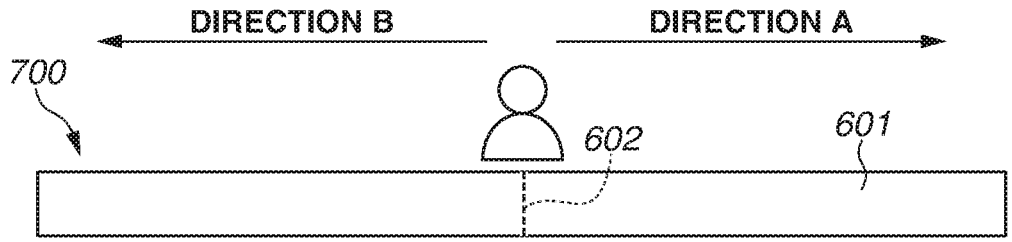
FIGS. 7A to 7E are diagrams illustrating an example of a progress bar according to the first exemplary embodiment.

Before the panoramic image capturing process is started, i.e., in the standby state in the panoramic image capturing mode, in step S301, the progress bar 600 or 700 in an initial display form illustrated in FIG. 6A or 7A is displayed at the position of the progress bar 403 in FIG. 4. During the image capturing standby state, the progress bar 600 or 700 may not be displayed, and after the panoramic image capturing process in FIG. 5 is started (i.e., after an image capturing instruction operation is performed), the progress bar 600 or 700 may be displayed.

A description is given below on the premise that panoramic image capturing is performed by the user swinging the camera 100 in a direction A (a first direction) illustrated in FIGS. 6A to 6E and 7A to 7E from an image capturing start, then turning back the swing direction, and swinging the camera 100 in a direction B (a second direction) opposite to the direction A with respect to the position of the image capturing start.

In step S501, according to the start of the panoramic image capturing process, the system control unit 50 controls the imaging lens 200, the shutter 201, and the image capturing unit 202 to capture the first image and holds the captured image in the memory 207.

In step S502, the system control unit 50 determines whether a condition for ending panoramic image capturing is satisfied. If the condition for ending panoramic image capturing is satisfied (Yes in step S502), the processing proceeds to step S520. If the end condition is not satisfied (if a condition for continuing panoramic image capturing is satisfied) (No in step S502), the processing proceeds to step S503. Examples of the end condition include the condition that the full press of the shutter button 102 is released, i.e., the condition that an instruction to end image capturing is received.

Thus, in step S502, the system control unit 50 determines whether the full press of the shutter button 102 is continued. If the full press of the shutter button 102 is not continued, the processing proceeds to step S520. Other examples of the end condition include a case where the state where a change in the orientation of the camera 100 or an object is too great to combine images continues, a case where the remaining life of a battery decreases, and a case where the remaining number of images that can be recorded in the recording medium 109 is insufficient.

In step S503, similar to step S501, the system control unit 50 controls the imaging lens 200, the shutter 201, and the image capturing unit 202 to capture the second image and holds the captured image in the memory 207.

In step S504, using the image processing unit 205 (or using the orientation detection unit 218 alone or in combination with the image processing unit 205), the system control unit 50 detects the amount of movement from the first and second captured images held in steps S501 and S503 and calculates the amount of swing.

In step S505, based on the detection result of the amount of movement in step S504, the system control unit 50 determines whether the images can be combined. If the amount of movement cannot be detected in step S504, it is determined that the images cannot be combined (No in step S505). Then, the processing returns to step S502. If not (Yes in step S505), the processing proceeds to step S506. In step S502 after step S505, if the amount of movement cannot be detected a predetermined number of times or more in step S504 (if the end condition is satisfied that the state where a change in the orientation of the camera 100 or an object is too great to combine images continues) (Yes in step S502), the processing proceeds to step S520.

In step S506, using the image processing unit 205, the system control unit 50 combines the first and second images based on the detection result of the amount of movement in step S504, thereby generating a panoramic image. The system control unit 50 holds the generated panoramic image in the memory 207.

In step S507, based on the detection result of the amount of movement in step S504, the system control unit 50 stores information regarding to which of the left and right the camera 100 moves from the capturing of the first image to the capturing of the second image, as an initial moving direction D in the system memory 210.

FIGS. 6A to 6E and 7A to 7E illustrate cases where the initial moving direction D is the direction A, which is from left to right facing the object. In a case where the initial moving direction D is the direction B, which is from right to left, control left-right reversed from the content illustrated in FIGS. 6A to 6E and 7A to 7E is performed.

In step S508, the system control unit 50 performs a progress bar update process 1 on the progress bar 600 or 700 displayed at the display unit 101. In the progress bar update process 1, using the detection result of the amount of movement in step S504, the system control unit 50 displays the combining-completed range 605 as the amount of movement in the direction A from the image capturing start position 602 in FIGS. 6A to 6E and 7A to 7E.

Figure 6B:
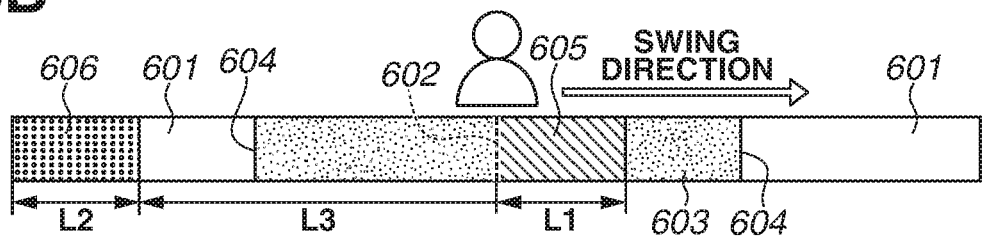
Figure 7B:
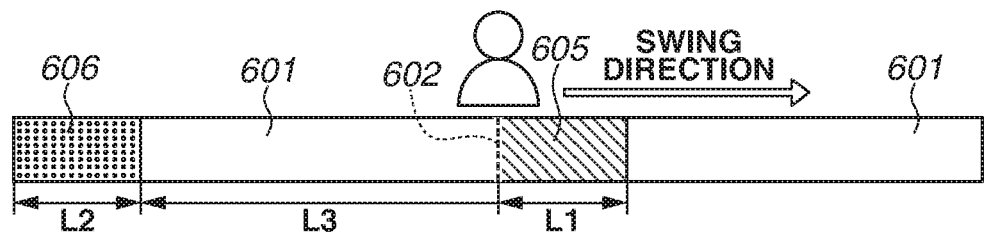
Figure 7C:
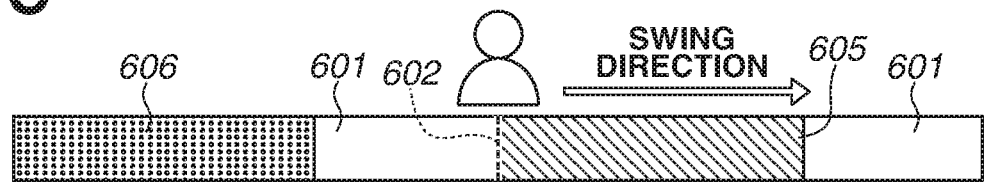

Thus, as illustrated in FIGS. 6B and 7B, the display color of the progress bar 600 or 700 is sequentially changed corresponding to the amount of movement in the direction A from the image capturing start position 602. Specifically, the progress bar 600 or 700 is displayed such that the combining-completed range 605 gradually expands in the direction A from the image capturing start position 602. By viewing this, the user can recognize that the swing motion and the image capturing in the initial moving direction D are satisfactory.

If the combining-completed range 605 does not reach the boundary 604, the user can recognize that to obtain a panoramic image having bilaterally equal widths with respect to the image capturing start position 602 by swinging the camera 100 by the maximum swing-possible amount, the user should still swing the camera 100 in the direction A.

If the combining-completed range 605 does not reach the right end of the swing-possible range 601, the user can recognize that if the user does not turn back the swing direction, the user can still swing the camera 100 in the direction A.

At this time, using the detection result of the amount of movement in step S504, the system control unit 50 displays the swing-impossible range 606 (see FIGS. 6B and 7B) from the left end of the swing-possible range 601. The system control unit 50 performs display such that a length L1 of the combining-completed range 605 and a length L2 of the swing-impossible range 606 are approximately the same length, or so that the user can recognize that the lengths L1 and L2 are approximately the same length.

Thus, the user can recognize that even if the user turns back the swing direction from the current time, the swing-impossible range 606 cannot be included in the image capturing range of a panoramic image. Conversely, the user can recognize that if the user immediately turns back the swing direction, a portion up to the left end of the swing-possible range 601 (the right end of the swing-impossible range 606) can be included in the image capturing range of a panoramic image. At this time, a length L3 from the left end of the combining-completed range 605 (the image capturing start position 602) to the left end of the swing-possible range 601 (the right end of the swing-impossible range 606) illustrated in FIGS. 6B and 7B corresponds to an example of a movable amount in a second direction by which an image used for a panoramic image can be captured.

If the user continues to swing the camera 100 in the direction A as the initial moving direction D, the swing-impossible range 606 gradually expands from the left on the opposite side to the right. Thus, the user can intuitively easily understand that the further in the direction A the camera 100 is swung, the narrower to the right the swing-possible range 601 on the opposite side becomes. At this time, the swing-possible range 601 and the swing-impossible range 606 are displayed, whereby the user can confirm on the same screen the movable amount by which the camera 100 continues to be swung in the direction A, and the movable amount by which the camera 100 is swung in the direction B by turning back the swing direction.

Figure 6C:
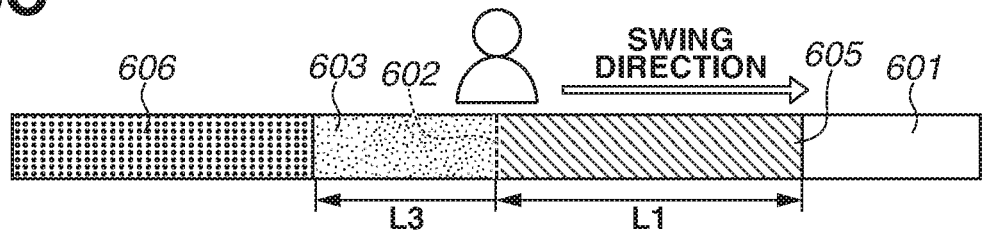

As illustrated in FIG. 6C, in a case where the right end of the combining-completed range 605 goes beyond the boundary 604, the system control unit 50 displays the assumed combined range 603 by moving the left end of the assumed combined range 603 in the direction A based on the detection result of the amount of movement in step S504. In other words, the swing-impossible range 606 eats into the previously displayed assumed combined range 603 from the left, and an end portion in the direction B of the assumed combined range 603 narrows. The system control unit 50 performs display such that the longer (greater) the length L1 of the combining-completed range 605, the shorter (smaller) the length L3 from the image capturing start position 602 to the left end of the swing-possible range 601 (the right end of the swing-impossible range 606).

Thus, the user can recognize that if the user turns back the swing direction from the current time, a panoramic image wider in the direction A from the image capturing start position 602 than in the direction B that is the opposite direction with respect to the image capturing start position 602 is generated. In FIGS. 7A to 7E, control regarding the display of the assumed combined range 603 is not performed.

In step S509, similar to step S502, the system control unit 50 determines whether the condition for ending panoramic image capturing is satisfied. If the end condition is satisfied (Yes in step S509), the processing proceeds to step S520. If the end condition is not satisfied (if the continuation condition is satisfied) (No in step S509), the processing proceeds to step S510. Examples of the end condition in step S509 newly include the condition that the amount of movement reaches a predetermined amount of movement, i.e., the condition that the swing-possible range 601 is not present. Thus, the system control unit 50 determines whether the swing-possible range 601 is present. Then, if the swing-possible range 601 is not present, it is determined that the end condition is satisfied. Then, the processing proceeds to step S520. The case where the swing-possible range 601 is not present is a case where the camera 100 is largely swung in a single direction as the initial moving direction D (the direction A in FIGS. 6A to 6E and 7A to 7E), and the storage area of the buffer for a panoramic image prepared in the memory 207 runs out before the swing direction is turned back. The case where the storage area of the buffer runs out is a case where the amount of acquisition of images obtained by a series of image capturing operations reaches an amount (a predetermined amount) filling the storage area of the buffer. Alternatively, the case where the storage area of the buffer runs out is a case where the size (the number of pixels) in the swing direction of images to be combined reaches a maximum value (a limit value) before the swing direction is turned back, and the size (the number of pixels) cannot be increased any further in a direction parallel to the swing direction. That is, this is a case where the amount of acquisition of images obtained by a series of image capturing operations reaches an amount (a predetermined amount) required to generate a combined image having a maximum value. In this case, the system control unit 50 generates a panoramic image using only images captured during the swing in the single direction.

If the swing-possible range 601 is not present, i.e., if the right end of the combining-completed range 605 goes beyond the right end of the swing-possible range 601, the system control unit 50 notifies the user of the state by indicating that the swing goes beyond the swing-possible range, or producing a sound.

In step S510, similar to steps S501 and S503, the system control unit 50 controls the imaging lens 200, the shutter 201, and the image capturing unit 202 to capture the third or subsequent image and holds the captured image in the memory 207. The third or subsequent image is captured in step S510.

In step S511, using the image processing unit 205, the system control unit 50 detects the amount of movement from the most recently captured image among the third and subsequent images held in step S510, and the panoramic image generated until immediately before this step and held in step S506, and calculates the amount of swing. The system control unit 50 may detect the amount of movement using the orientation detection unit 218 alone or in combination with the image processing unit 205.

In step S512, based on the initial moving direction D held in step S507 and the detection result of the amount of movement in step S511, the system control unit 50 determines whether the initial moving direction D from the first image to the second image and the swing direction from image capturing performed one time before to image capturing performed most recently are the same direction. That is, the system control unit 50 determines whether the current swing direction is the same as the initial moving direction D. If the swing direction is the same as the initial moving direction D (Yes in step S512), the processing proceeds to step S513. If not (No in step S512), the processing proceeds to step S515.

In step S513, similar to step S505, based on the detection result of the amount of movement in step S511, the system control unit 50 determines whether the images can be combined. If the amount of movement cannot be detected in step S511, it is determined that the images cannot be combined (No in step S513). Then, the processing returns to step S509. If not (Yes in step S513), the processing proceeds to step S514.

In step S514, similar to step S506, using the image processing unit 205, the system control unit 50 combines the third captured image held in step S510 and the panoramic image held in step S506 based on the detection result of the amount of movement in step S511, thereby generating a panoramic image. The system control unit 50 holds the generated panoramic image in the memory 207. The panoramic image generated at this time is a panoramic image of which the angle of view is wider than that of the panoramic image held in step S506 (the image size in the moving direction is larger than that of the panoramic image held in step S506).

In step S508 after step S514, using the detection result of the amount of movement in step S511, the system control unit 50 performs the progress bar update process 1 on the progress bar 600 or 700 displayed at the display unit 101.

On the other hand, if it is determined in step S512 that the swing direction is not the initial moving direction D, i.e., if the turning back (switching) of the swing direction occurs (No in step S512), the processing proceeds to step S515.

In step S515, based on the detection results of the amounts of movement in steps S504 and S511, the system control unit 50 determines whether the image is captured in step S510 in the direction B with respect to the image capturing start position 602 (a portion further in the direction B than the first image is imaged). If the image is captured in step S510 further in the direction B than the image capturing start position 602 (Yes in step S515), the processing proceeds to step S516. If not (No in step S515), the processing proceeds to step S509. The case where the determination is No in step S515 is a case where the swing does not return to the first image capturing start position 602 after the turning back of the swing direction occurs. An object to be imaged in this section is already imaged while the camera 100 moves in the direction A. Thus, the object appears in the panoramic image. Thus, if an image is captured in step S510, and the determination is No in step S515 immediately after that, the system control unit 50 discards the captured image without using the captured image for the combining of a panoramic image. The captured image, however, may be used to complementarily combine with an already generated panoramic image.

In step S516, similar to step S513, based on the detection result of the amount of movement in step S511, the system control unit 50 determines whether the images can be combined. If the amount of movement cannot be detected in step S511, it is determined that the images cannot be combined (No in step S516). Then, the processing returns to step S509. If not (Yes in step S516), the processing proceeds to step S517.

In step S517, similar to step S514, using the image processing unit 205, the system control unit 50 combines the captured image held in step S510 and the panoramic image held in step S506 based on the detection result of the amount of movement in step S511, thereby generating a panoramic image. The system control unit 50 holds the generated panoramic image in the memory 207. The panoramic image generated at this time is a panoramic image of which the angle of view is wider than that of the panoramic image held in step S506 (the image size in the moving direction is larger than that of the panoramic image held in step S506).

In step S518, the system control unit 50 performs a progress bar update process 2 on the progress bar 600 or 700 displayed at the display unit 101. In the progress bar update process 2, using the detection result of the amount of movement in step S511, the system control unit 50 displays the combining-completed range 605 as the amount of movement in the direction B from the image capturing start position 602 in FIGS. 6A to 6E and 7A to 7E.

Figure 6D:
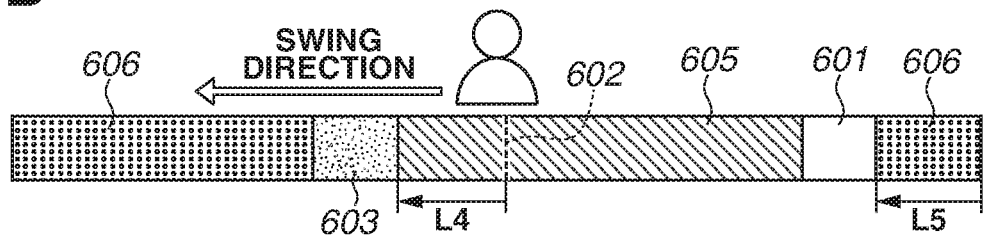
Figure 7D:
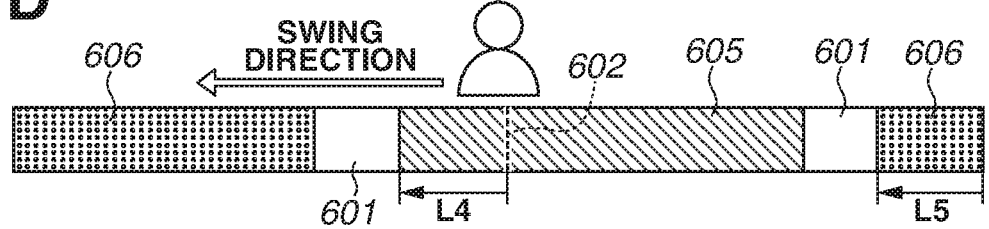

That is, as illustrated in FIGS. 6D and 7D, the display color of the progress bar 600 or 700 is sequentially changed corresponding to the amount of movement in the direction B from the image capturing start position 602.

Specifically, the progress bar 600 or 700 is displayed such that the combining-completed range 605 gradually expands in the direction B from the image capturing start position 602. By viewing this, the user can view the state where the combining-completed range 605 extends in the direction B, and therefore can recognize that a portion corresponding to the current swing motion is used to generate a panoramic image. That is, the user can understand that after the swing direction is turned back, the combining of an image further in the direction B than the image capturing start position 602 is safely started.

Further, the progress bar 600 or 700 is displayed such that the combining-completed range 605 gradually comes close to the swing-impossible range 606. By viewing this, the user can recognize the remaining amount of movement in the direction B by which an image can be included in the image capturing range of a panoramic image.

At this time, using the detection result of the amount of movement in step S511, the system control unit 50 displays the swing-impossible range 606 from the right end of the swing-possible range 601. The system control unit 50 performs display such that a length L4 from the image capturing start position 602 to the left end of the combining-completed range 605 and a length L5 of the swing-impossible range 606 are approximately the same length, or so that the user can recognize that the lengths L4 and L5 are approximately the same length.

By viewing this, the user can recognize that an image can still be included in the image capturing range of a panoramic image by moving the camera 100 in the direction A, and also recognize the remaining amount of movement in the direction A at that time. Further, the user can recognize the width of the range in each of the directions A and B from the image capturing start position 602 in an obtained panoramic image.

Figure 6E:
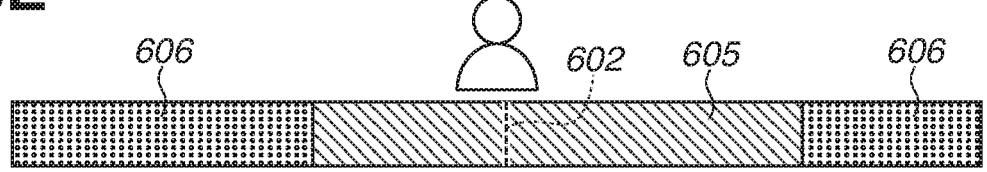
Figure 7E:
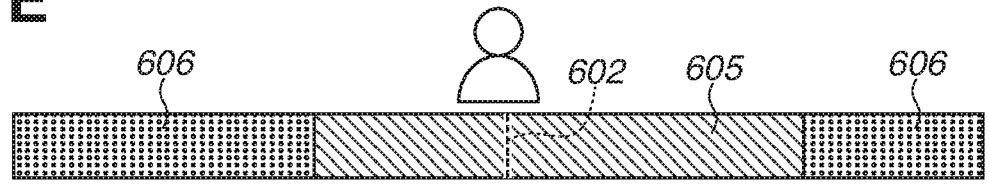

In step S519, similar to step S509, the system control unit 50 determines whether the condition for ending panoramic image capturing is satisfied. If the end condition is satisfied (Yes in step S519), the processing proceeds to step S520. If not (No in step S519), the processing proceeds to step S509. Examples of the end condition in step S519 also include the condition that the swing-possible range 601 or the assumed combined range 603 is not present in the direction B opposite to the direction A. The case where the swing-possible range 601 or the assumed combined range 603 is not present in the direction B is a case where a swing operation for panoramic image capturing for a single time is completed by safely swinging the camera 100 by the maximum swing-possible amount, including the turning back of the swing direction. In this case, as illustrated in FIGS. 6E and 7E, the swing-possible range 601 or the assumed combined range 603 is not present in the progress bar 600 or 700. Thus, the user can recognize that the swing motion is normally completed due to its termination. If the assumed combined range 603 is not present, i.e., if the left end of the combining-completed range 605 goes beyond the left end of the assumed combined range 603, the system control unit 50 notifies the user of the state by indicating that the swing goes beyond the swing-possible range, or producing a sound. Further, if the swing-possible range 601 is not present, i.e., if the left end of the combining-completed range 605 goes beyond the left end of the swing-possible range 601, the system control unit 50 notifies the user of the state by indicating that the swing goes beyond the swing-possible range, or producing a sound.

In step S520, the system control unit 50 adds an image capturing condition to the generated panoramic image, thereby generating a panoramic image file.

In step S521, the system control unit 50 saves (records) the panoramic image file generated in step S520 in the recording medium 109 and ends the panoramic image capturing process.

As described above, when a user swings a camera in one direction as an initial moving direction, then according to the fact that a condition for ending image capturing is satisfied, a panoramic image is generated by combining only images captured when the user swings the camera in the one direction. Consequently, before panoramic image capturing is performed, the user does not need to set in advance whether to capture images without turning back a swing direction or capture images by turning back the swing direction. Thus, it is possible to improve usability for the user in a case where panoramic image capturing is performed using any of a technique for swinging a camera in one direction and a technique for swinging the camera in both directions.

Furthermore, the above progress bars can let the user know the storage area for a panoramic image that changes during image capturing. Thus, the user can start image capturing and end image capturing from a desired angle of view. Thus, it is possible to improve usability for the user.

A case is assumed where, after panoramic image capturing is started, the user swings the camera 100 in one direction without turning back the swing direction. In this case, based on the above progress bars, by viewing the length to the end of the swing-possible range 601 in the direction A in FIG. 6A or 7A, it is possible to grasp how far images can be captured.

On the other hand, a case is assumed where, after panoramic image capturing is started, the user swings the camera 100 by turning back the swing direction. In this case, based on the display of the above progress bars, by viewing the length to the end in the direction B of the assumed combined range 603 in FIG. 6D or the swing-possible range 601 in FIG. 7D, it is possible to grasp how far images can be captured.

As described above, the progress bars illustrated in FIGS. 6A to 6E and 7A to 7E are progress guides capable of displaying information useful for both a case where the swing direction is not turned back and a case where the swing direction is turned back. Thus, in a case where panoramic image capturing is performed, it is not necessary to prepare different progress bars (progress guides) according to whether to capture images without turning back the swing direction or capture images by turning back the swing direction. That is, after panoramic image capturing is started, and while a swing motion is performed, by viewing a progress bar, it is possible to grasp a swing-possible range in both a case where the swing direction is turned back and a case where the swing direction is not turned back. Further, based on the state of an object, the user can adaptively determine whether to turn back the swing direction at that time.

Next, with reference to the flowchart in FIG. 5 and FIGS. 8A to 8E and 9A to 9E, progress bars according to a second exemplary embodiment will be described. The second exemplary embodiment is different from the first exemplary embodiment only in the display forms of the progress bars and the method for displaying the progress bar in steps S508 and S518 in FIG. 5. Thus, the differences are mainly described.

FIGS. 8A to 8E and 9A to 9E are diagrams illustrating examples of progress bars 800 and 900 according to the second exemplary embodiment. Components similar to those of the first exemplary embodiment are designated by the same signs. The description of display similar to that in the first exemplary embodiment is appropriately omitted. FIGS. 8A to 8E are a third example of display of the progress bar 403 in FIG. 4. FIGS. 9A to 9E are a fourth example of display of the progress bar 403 in FIG. 4 as an example different from the third example of display illustrated in FIGS. 8A to 8E.

Figure 8A:
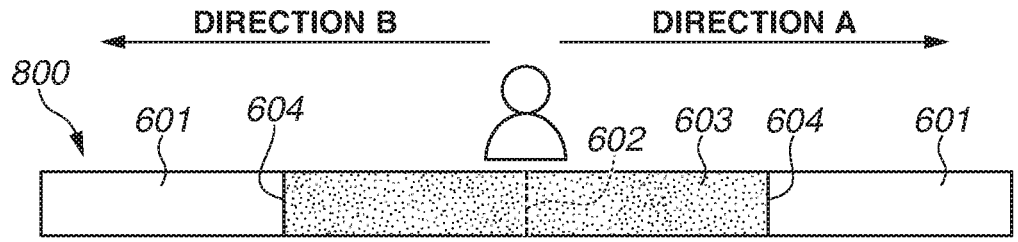
FIGS. 8A to 8E are diagrams illustrating an example of a progress bar according to a second exemplary embodiment.
Figure 9A:
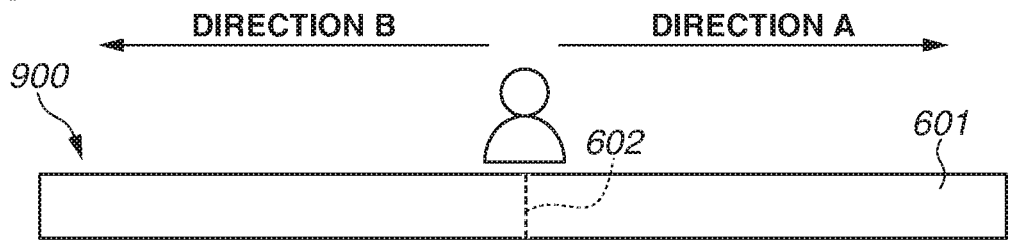
FIGS. 9A to 9E are diagrams illustrating an example of a progress bar according to the second exemplary embodiment.

In FIGS. 8A and 9A, a swing-possible range 601 and an image capturing start position 602 are displayed. Further, in FIG. 8A, an assumed combined range 603 and a boundary 604 between the swing-possible range 601 and the assumed combined range 603 are displayed. On the other hand, in FIG. 9A, the assumed combined range 603 and the boundary 604 are not displayed.

Figure 8B:
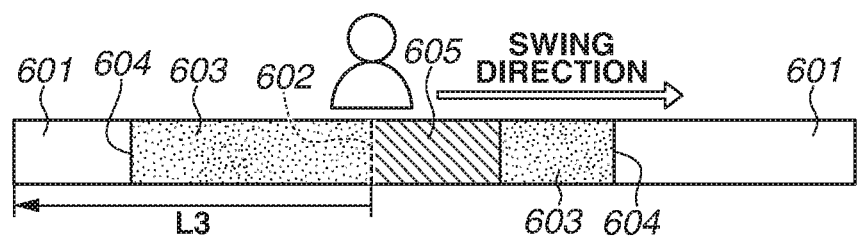
Figure 9B:
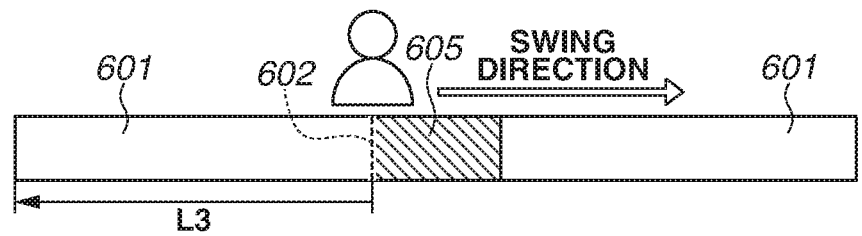
Figure 9C:
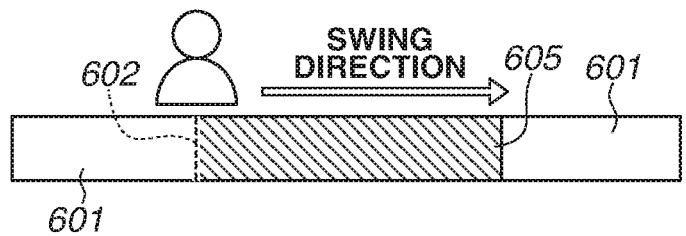

In FIGS. 8B and 9B, a combining-completed range 605 is displayed. Meanwhile, in the progress bars 800 and 900 according to the present exemplary embodiment, the swing-impossible range 606 displayed in the first exemplary embodiment is not displayed.

First, before the panoramic image capturing process is started, i.e., in the standby state in the panoramic image capturing mode, the progress bar 800 or 900 in an initial display form illustrated in FIG. 8A or 9A is displayed.

In step S508, the system control unit 50 performs a progress bar update process 1 on the progress bar 800 or 900 displayed at the display unit 101. In the progress bar update process 1, using the detection result of the amount of movement in step S504, the system control unit 50 displays the combining-completed range 605 as the amount of movement in the direction A from the image capturing start position 602 (see FIGS. 8B and 9B).

As illustrated in FIGS. 8B and 9B, the display color of the progress bar 800 or 900 is sequentially changed corresponding to the amount of movement in the direction A from the image capturing start position 602. Specifically, the progress bar 800 or 900 is displayed such that the combining-completed range 605 gradually expands in the direction A from the image capturing start position 602.

At this time, using the detection result of the amount of movement in step S504, the system control unit 50 displays the swing-possible range 601 by moving the left end of the swing-possible range 601 to the image capturing start position 602 side.

Thus, the user can recognize that even if the user turns back the swing direction from the current time, a portion beyond the left end of the swing-possible range 601 cannot be included in the image capturing range of a panoramic image. Conversely, the user can recognize that if the user immediately turns back the swing direction, a portion up to the left end of the swing-possible range 601 can be included in the image capturing range of a panoramic image. At this time, a length L3 from the left end of the combining-completed range 605 (the image capturing start position 602) to the left end of the swing-possible range 601 illustrated in FIGS. 8B and 9B corresponds to an example of a movable amount in a second direction by which an image used for a panoramic image can be captured.

The user can intuitively easily understand that if the user continues to swing the camera 100 in the direction A as the initial moving direction D, the swing-possible range 601 on the opposite side narrows to the right.

Figure 8C:
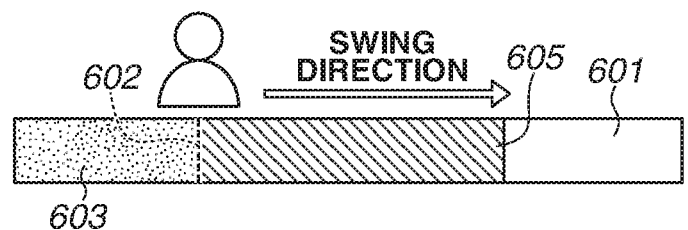

As illustrated in FIG. 8C, in a case where the right end of the combining-completed range 605 goes beyond the boundary 604, the system control unit 50 displays the assumed combined range 603 by moving the left end of the assumed combined range 603 or the left end of the swing-possible range 601 in the direction A based on the detection result of the amount of movement in step S504.

Thus, the user can recognize that if the user turns back the swing direction from the current time, a panoramic image wider in the direction A from the image capturing start position 602 than in the direction B that is the opposite direction with respect to the image capturing start position 602 is generated. In FIGS. 9A to 9E, control regarding the display of the assumed combined range 603 is not performed.

In step S518, the system control unit 50 performs a progress bar update process 2 on the progress bar 800 or 900 displayed at the display unit 101. In the progress bar update process 2, using the detection result of the amount of movement in step S511, the system control unit 50 displays the combining-completed range 605 as the amount of movement in the direction B from the image capturing start position 602 in FIGS. 8A to 8E and 9A to 9E.

Figure 8D:
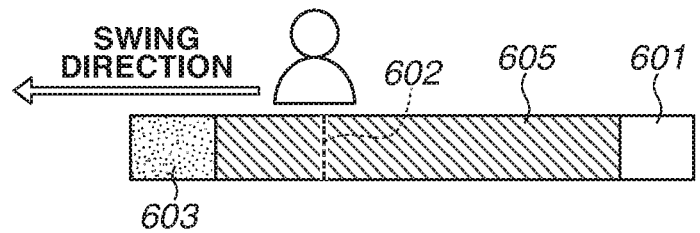
Figure 9D:
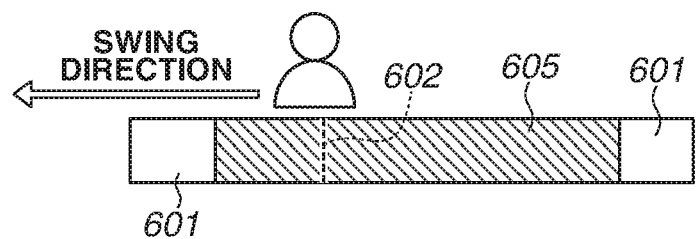

As illustrated in FIGS. 8D and 9D, the display color of the progress bar 800 or 900 is sequentially changed corresponding to the amount of movement in the direction B from the image capturing start position 602. Specifically, the progress bar 800 or 900 is displayed such that the combining-completed range 605 gradually expands in the direction B from the image capturing start position 602. The progress bar 800 or 900 is displayed such that the combining-completed range 605 gradually comes close to the left end of the assumed combined range 603 or the swing-possible range 601. By viewing this, the user can recognize the remaining amount of movement by which an image can be included in the image capturing range of a panoramic image. At this time, the system control unit 50 displays the swing-possible range 601 by gradually moving the right end of the swing-possible range 601 to the image capturing start position 602 side.

Figure 8E:
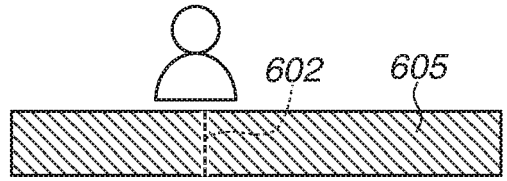
Figure 9E:
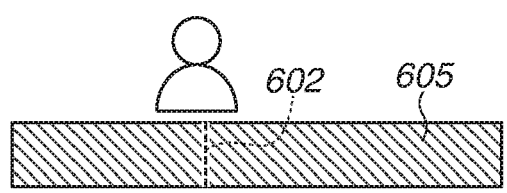

If the condition for ending panoramic image capturing is satisfied in step S519 (Yes in step S519), then as illustrated in FIGS. 8E and 9E, the swing-possible range 601 or the assumed combined range 603 is not present in the progress bar 800 or 900. Thus, the user can recognize that the swing motion is normally completed due to its termination.

As described above, similar the effects described in the first exemplary embodiment, the progress bars according to the present exemplary embodiment can let the user know the storage area for a panoramic image that changes during image capturing. Thus, the user can start image capturing and end image capturing from a desired angle of view.

Further, in the progress bars according to the present exemplary embodiment, the swing-impossible range 606 in the first exemplary embodiment is not displayed, whereby it is possible to display a progress guide more simply. The swing-impossible range 606 can be replaced with an end portion of the swing-possible range 601 or an end portion of the assumed combined range 603. Thus, based on the end portion of the swing-possible range 601 or the end portion of the assumed combined range 603, the user can grasp the amount of movement by which an image used for a panoramic image can be captured.

Next, with reference to the flowchart in FIG. 5 and FIGS. 10A to 10E, a progress bar according to a third exemplary embodiment will be described. The third exemplary embodiment is different from the first exemplary embodiment only in the display form of the progress bar and the method for displaying the progress bar in steps S508 and S518 in FIG. 5. Thus, the differences are mainly described.

FIGS. 10A to 10E are diagrams illustrating an example of a progress bar 1000 according to the third exemplary embodiment and is a fifth example of display of the progress bar 403 in FIG. 4. Components similar to those of the first exemplary embodiment are designated by the same signs. The description of display similar to that in the first exemplary embodiment is appropriately omitted.

Figure 10A:
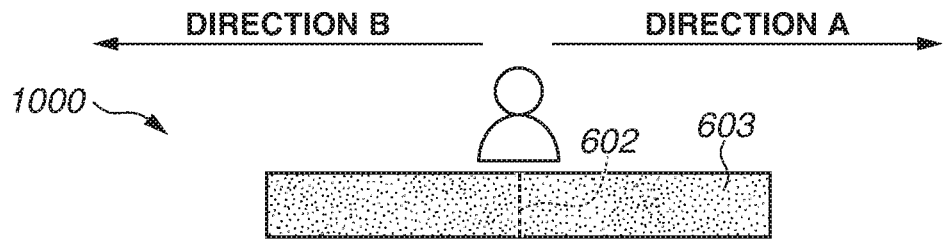
FIGS. 10A to 10E are diagrams illustrating an example of a progress bar according to a third exemplary embodiment.

In FIG. 10A, an image capturing start position 602 and an assumed combined range 603 are displayed.

Figure 10B:
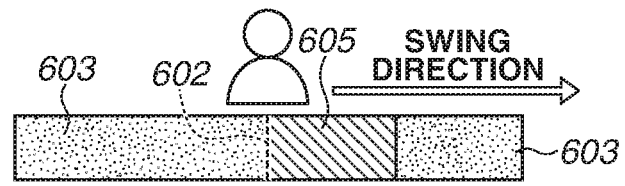

In FIG. 10B, a combining-completed range 605 is displayed. Meanwhile, in the progress bar 1000 according to the present exemplary embodiment, the swing-possible range 601, the boundary 604, and the swing-impossible range 606 displayed in the first exemplary embodiment are not displayed.

First, before the panoramic image capturing process is started, i.e., in the standby state in the panoramic image capturing mode, the progress bar 1000 in an initial display form illustrated in FIG. 10A is displayed. In a progress bar update process 1, using the detection result of the amount of movement in step S504, the system control unit 50 displays the combining-completed range 605 as the amount of movement in the direction A from the image capturing start position 602 in FIG. 10A.

As illustrated in FIG. 10B, the display color of the progress bar 1000 is sequentially changed corresponding to the amount of movement by which the image capturing direction is moved in the direction A from the image capturing start position 602. Specifically, the progress bar 1000 is displayed such that the combining-completed range 605 gradually expands in the direction A from the image capturing start position 602.

At this time, the system control unit 50 does not move the left end of the assumed combined range 603 by fixing the left end of the assumed combined range 603. If the combining-completed range 605 does not reach the right end of the assumed combined range 603, the user can recognize that to obtain a panoramic image having bilaterally equal widths with respect to the image capturing start position 602 by swinging the camera 100 by the maximum swing-possible amount, the user should still swing the camera 100 in the direction A.

Figure 10C:
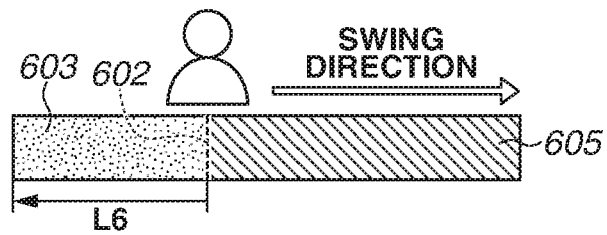

As illustrated in FIG. 10C, in a case where the right end of the combining-completed range 605 goes beyond the right end of the assumed combined range 603, the system control unit 50 displays the assumed combined range 603 by moving the left end of the assumed combined range 603 in the direction A based on the detection result of the amount of movement in step S504.

Thus, the user can recognize that if the user turns back the swing direction from the current time, a panoramic image wider in the direction A from the image capturing start position 602 than in the direction B that is the opposite direction with respect to the image capturing start position 602 is generated. At this time, a length L6 from the left end of the combining-completed range 605 (the image capturing start position 602) to the left end of the assumed combined range 603 illustrated in FIG. 10C corresponds to an example of a movable amount in a second direction by which an image used for a panoramic image can be captured.

The user can intuitively easily understand if the user continues to swing the camera 100 in the direction A, the assumed combined range 603 on the opposite side narrows to the right.

In step S518, the system control unit 50 performs a progress bar update process 2 on the progress bar 1000 displayed at the display unit 101. In the progress bar update process 2, using the detection result of the amount of movement in step S511, the system control unit 50 displays the combining-completed range 605 as the amount of movement in the direction B from the image capturing start position 602 in FIGS. 10A to 10E.

Figure 10D:
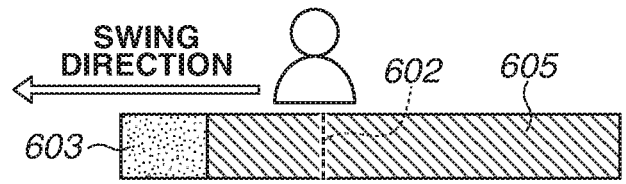

As illustrated in FIG. 10D, the display color of the progress bar 1000 is sequentially changed corresponding to the amount of movement in the direction B from the image capturing start position 602. Specifically, the progress bar 1000 is displayed such that the combining-completed range 605 gradually expands in the direction B from the image capturing start position 602. The progress bar 1000 is displayed such that the combining-completed range 605 gradually comes close to the left end of the assumed combined range 603. By viewing this, the user can recognize the remaining amount of movement by which an image can be included in the image capturing range of a panoramic image.

Figure 10E:
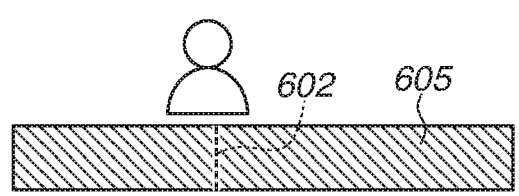

If the condition for ending panoramic image capturing is satisfied in step S519 (Yes in step S519), then as illustrated in FIG. 10E, the assumed combined range 603 is not present in the progress bar 1000. Thus, the user can recognize that the swing motion is normally completed due to its termination.

As described above, the progress bar according to the present exemplary embodiment can let the user know the storage area for a panoramic image particularly after the combining-completed range 605 goes beyond the assumed combined range 603.

Further, in the progress bar according to the present exemplary embodiment, the swing-possible range 601 and the swing-impossible range 606 in the first exemplary embodiment are not displayed, whereby it is possible to display a progress guide more simply.

Next, with reference to the flowchart in FIG. 5 and FIGS. 11A to 11E and 12A to 12E, progress bars according to a fourth exemplary embodiment will be described. The fourth exemplary embodiment is different from the first exemplary embodiment in the display forms of the progress bars and the method for displaying the progress bar in step S508 in FIG. 5. Thus, the differences are mainly described. In the present exemplary embodiment, if the determination is No in step S515, the processing proceeds to step S508. In S508, the progress bar is updated.

FIGS. 11A to 11E and 12A to 12E are diagrams illustrating examples of progress bars 1100 and 1200 according to the fourth exemplary embodiment. FIGS. 11A to 11E are a sixth example of display of the progress bar 403 in FIG. 4. FIGS. 12A to 12E are a seventh example of display of the progress bar 403 in FIG. 4 as an example different from the sixth example of display illustrated in FIGS. 11A to 11E. Components similar to those of the first exemplary embodiment are designated by the same signs. The description of display similar to that in the first exemplary embodiment is appropriately omitted.

Figure 11A:
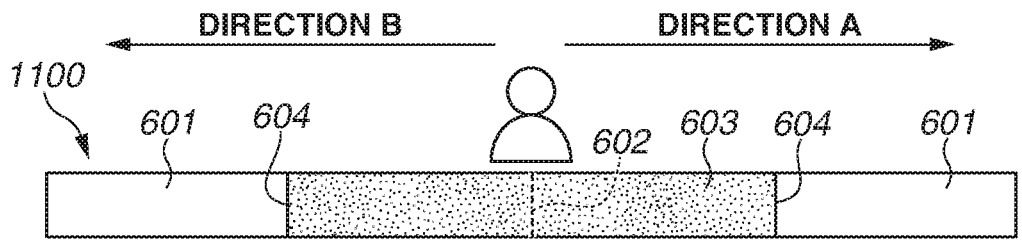
FIGS. 11A to 11E are diagrams illustrating an example of a progress bar according to a fourth exemplary embodiment.
Figure 11B:
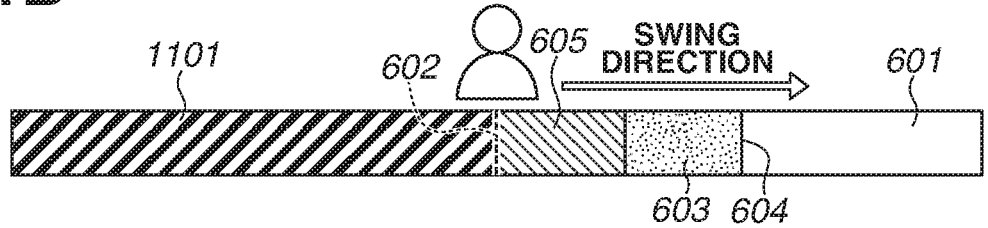

In FIG. 11A, a swing-possible range 601 is displayed. Furthermore, in FIGS. 11A and 12A, an image capturing start position 602 and an assumed combined range 603 are displayed. Further, in FIG. 11A, a boundary 604 between the swing-possible range 601 and the assumed combined range 603 is displayed. On the other hand, in FIG. 12A, the swing-possible range 601 and the boundary 604 are not displayed. In FIGS. 11B and 12B, a combining-completed range 605 is displayed.

An area 1101 in FIGS. 11B and 12B indicates a swing-possibility-uncertain range (hereinafter referred to as an "uncertain range 1101") where the swing-possible amount is uncertain.

An area 1102 in FIGS. 11D and 12D indicates a combining-completed range (hereinafter referred to as a "combining-completed range 1102") when the camera 100 is swung in the direction B. In the combining-completed range 1102 in the direction B, a range up to the image capturing start position 602 is a combining-completed range already combined into a panoramic image when the camera 100 is swung in the direction A. On the other hand, in the combining-completed range 1102 in the direction B, a range beyond the image capturing start position 602 in the direction B is a combining-completed range combined into a panoramic image when the camera 100 is swung in the direction B.

An area 1103 in FIG. 11D indicates a swing-impossible range (hereinafter referred to as a "swing-impossible range 1103") where the camera 100 cannot be swung according to the combining-completed range 605.

Figure 12A:
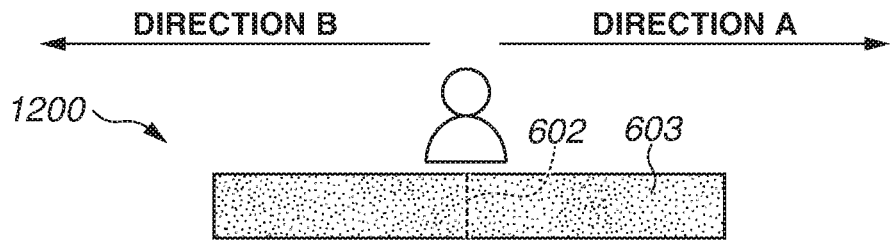
FIGS. 12A to 12E are diagrams illustrating an example of a progress bar according to the fourth exemplary embodiment.
Figure 12B:
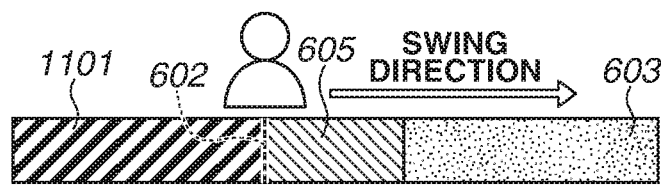

First, before the panoramic image capturing process is started, i.e., in the standby state in the panoramic image capturing mode, the progress bar 1100 or 1200 in an initial display form illustrated in FIG. 11A or 12A is displayed.

In step S508, the system control unit 50 performs a progress bar update process 1 on the progress bar 1100 or 1200 displayed at the display unit 101. In the progress bar update process 1, using the detection result of the amount of movement in step S504, the system control unit 50 displays the combining-completed range 605 as the amount of movement in the direction A from the image capturing start position 602 (see FIGS. 11B and 12B). Specifically, the progress bar 1100 or 1200 is displayed such that the combining-completed range 605 gradually expands in the direction A from the image capturing start position 602. At this time, since the swing direction is not yet turned back in the direction B, the swing-possible amount in the direction B is not certain. Thus, the system control unit 50 displays the uncertain range 1101 by masking a portion further in the direction B than the image capturing start position 602. By viewing this, the user can concentrate on how much the user swings the camera 100 in the direction A. For example, in FIG. 11B, the user can recognize that to obtain a panoramic image having bilaterally equal widths with respect to the image capturing start position 602, the user should still swing the camera 100 in the direction A to the boundary 604. Further, in FIG. 11B, the user can recognize that to obtain a panoramic image only in the direction A from the image capturing start position 602, the user should swing the camera 100 in the direction A to the right end of the swing-possible range 601. In FIG. 12B, if the user continues to swing the camera 100 in the direction A, the assumed combined range 603 gradually expands in the direction A. Thus, the user can easily understand that the user can swing the camera 100 in the direction A to the right end of the assumed combined range 603.

Figure 11C:
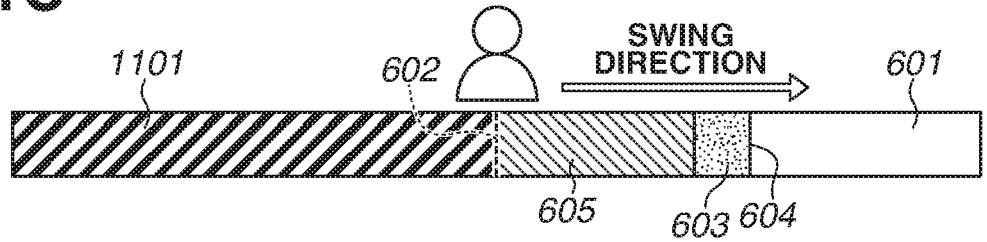
Figure 12C:

As illustrated in FIGS. 11C and 12C, if the user further continues to swing the camera 100 in the direction A, the combining-completed range 605 is displayed by gradually expanding in the direction A. In FIG. 12C, even if the user continues to swing the camera 100 in the direction A, the assumed combined range 603 does not expand in the direction A in the middle. Thus, the user can recognize that only a portion up to the right end of the assumed combined range 603 can be included in the image capturing range of a panoramic image.

In step S518 after step S515, the system control unit 50 performs a progress bar update process 1 on the progress bar 1100 or 1200 displayed at the display unit 101. In the progress bar update process 1, using the detection result of the amount of movement in step S511, the system control unit 50 displays the combining-completed range 1102 as the amount of movement in the direction B after the swing direction is turned back.

Figure 11D:
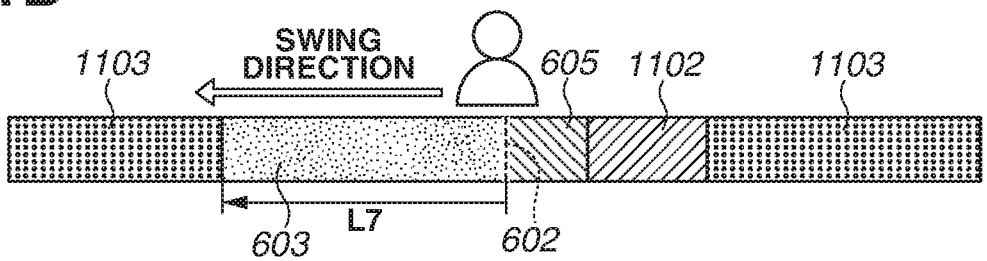
Figure 12D:
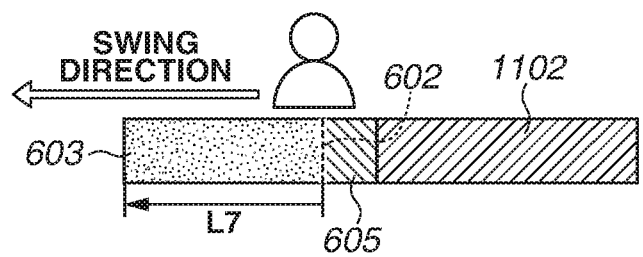

As illustrated in FIGS. 11D and 12D, the display color of the progress bar 1100 or 1200 is sequentially changed corresponding to the amount of movement in the direction B after the swing direction is turned back. Specifically, the progress bar 1100 or 1200 is displayed such that the combining-completed range 1102 gradually expands in the direction B to be painted over the combining-completed range 605. At this time, the combining-completed range 605 and the combining-completed range 1102 are displayed in different forms. Thus, by viewing this, the user can recognize that the position where an image is captured at the current time overlaps the position where an image is captured in the direction A. In other words, the user can guess the amount of movement to a position (the image capturing start position 602) that does not overlap the position where an image is captured in the direction A. Thus, it is possible to perform panoramic image capturing by causing the user to quickly swing the camera 100 at an overlapping position and carefully swing the camera 100 from a non-overlapping position.

Furthermore, as illustrated in FIG. 11D, the swing direction is turned back, whereby the masked uncertain range 1101 is displayed as the assumed combined range 603 and the swing-impossible range 1103. In FIG. 11D, the swing-impossible range 1103 in displayed on both left and right sides.

Further, as illustrated in FIG. 12D, the swing direction is turned back, whereby the masked uncertain range 1101 is displayed as the assumed combined range 603.

At this time, a length L7 from the image capturing start position 602 to the left end of the assumed combined range 603 (or the right end of the swing-impossible range 1103) illustrated in FIGS. 11D and 12D corresponds to an example of a movable amount in a second direction by which an image used for a panoramic image can be captured. By viewing this, the user can recognize the remaining amount of movement by which an image can be included in the image capturing range of a panoramic image. Particularly, even if the swing direction is turned back and the image capturing position at the current time overlaps a position in the direction A, the user can grasp the image capturing position at the current time. Thus, the user can determine whether an object present in the direction B can be included in a panoramic image, more easily than in a progress bar that does not enable the recognition of the image capturing position at the current time.

The system control unit 50 displays the left end position of the assumed combined range 603 based on the position where the swing direction is turned back, i.e., the right end position of the combining-completed range 1102. Display is performed such that the further in the direction A the right end position of the combining-completed range 1102 is, the closer to the image capturing start position 602 the left end position of the assumed combined range 603 is. Display is performed such that the closer to the image capturing start position 602 the right end position of the combining-completed range 1102 is, the further in the direction B the left end position of the assumed combined range 603 is.

Figure 11E:
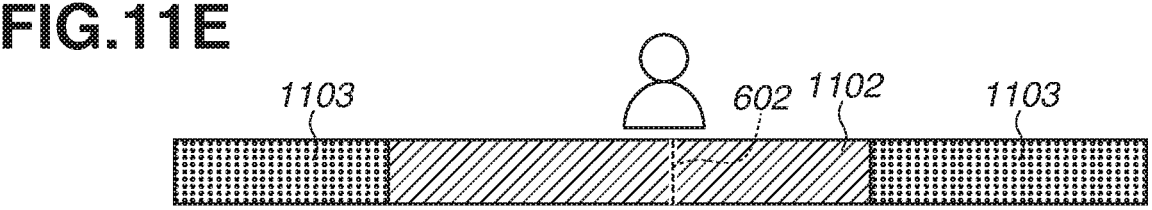
Figure 12E:
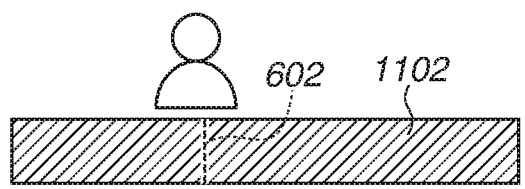

If the condition for ending panoramic image capturing is satisfied in step S519 (Yes in step S519), then as illustrated in FIGS. 11E and 12E, the assumed combined range 603 is not present in the progress bar 1100 or 1200. Thus, the user can recognize that the swing motion is normally completed due to its termination. As described above, similar to the effects described in the first exemplary embodiment, the progress bars according to the present exemplary embodiment can let the user know the storage area for a panoramic image that changes during image capturing. Thus, the user can start image capturing and end image capturing from a desired angle of view.

Further, based on the progress bars according to the present exemplary embodiment, in a case where the swing direction is the initial moving direction, the uncertain range 1101 is displayed on the opposite side of the initial moving direction with respect to the image capturing start position 602. Thus, the user can concentrate on how much the user swings the camera 100 in the initial moving direction. The swing-impossible range 1103 can be replaced with an end portion of the swing-possible range 601 or an end portion of the assumed combined range 603. Thus, based on the end portion of the swing-possible range 601 or the end portion of the assumed combined range 603, the user can grasp the amount of movement by which an image used for a panoramic image can be captured.

As described above, based on the camera 100 according to the present exemplary embodiment, in a case where an image capturing direction is moved in a first direction, then according to the fact that a condition for ending image capturing is satisfied, a combined image is generated by combining images captured when the image capturing direction is moved in the first direction. Thus, before panoramic image capturing is performed, the user does not need to set in advance whether to capture images without turning back a swing direction or capture images by turning back the swing direction. Thus, it is possible to improve usability for the user.

Furthermore, based on the camera 100 according to the present exemplary embodiment, according to the movement in the first direction, display indicating a movable amount in a second direction by which an image used for an image to be combined can be captured is performed, whereby it is possible to appropriately display an image-capturing-possible range to the user during panoramic image capturing. Thus, the user can easily grasp the amount of movement by which an image used for a panoramic image can be captured. Thus, the user can image a desired object to fall within the range of a panoramic image. Thus, it is possible to improve usability for the user.

Further, based on the camera 100 according to the present exemplary embodiment, display is performed such that the greater the amount of movement in the first direction, the smaller the movable amount in the second direction by which an image used for an image to be combined can be captured. Thus, the user can easily grasp that the further in the first direction the camera 100 is swung, the smaller the amount of movement in the second direction by which an image can be captured. Therefore, the user can image a desired object present in the second direction to fall within the range of a panoramic image.

The above various types of control performed by the system control unit 50 in the description may be performed by a single piece of hardware, or the processing of the above various types of control may be shared by a plurality of pieces of hardware (e.g., a plurality of processors or circuits), thereby controlling the entirety of the apparatus.

Further, a case has been described where the combining-completed range 605 according to each exemplary embodiment is displayed as a part of the progress bar. The disclosure, however, is not limited to this case. Alternatively, a reduced combined image may be displayed.

Furthermore, in each exemplary embodiment, a case has been described where the mode of capturing images while swinging the camera 100 in the horizontal direction is used. Alternatively, the mode of capturing images while swinging the camera 100 in the vertical direction may be used. In this case, it is possible to display the progress bars such that the progress bars are long in the vertical direction.

Further, the above bilaterally equal widths and the above bilateral symmetry include approximately equal widths and approximate symmetry, respectively.

Furthermore, while the disclosure has been described in detail based on its exemplary embodiments, the disclosure is not limited to these specific exemplary embodiments. The disclosure also includes various forms without departing from the spirit and scope of the disclosure. Further, the above exemplary embodiments merely illustrate exemplary embodiments of the disclosure, and can also be appropriately combined together.

Furthermore, in the above exemplary embodiment, as an example, a case has been described where the disclosure is applied to the camera 100. The disclosure, however, is not limited to this case, and is applicable to any apparatus capable of generating a panoramic image. That is, the disclosure is applicable to a smartphone, a tablet terminal, a mobile PC, a personal digital assistant (PDA), a mobile image viewer, a digital photo frame, a music player, a game apparatus, and an electronic book reader.

Further, the aspect of the embodiments is applicable not only to an imaging apparatus main body, but also to a control apparatus that communicates with an imaging apparatus (including a network camera) through wired or wireless communication and remotely controls the imaging apparatus. Examples of the apparatus that remotely controls the imaging apparatus include apparatuses such as a smartphone, a tablet PC, and a desktop PC. Based on operations performed in the control apparatus or processes performed in the control apparatus, the control apparatus notifies the imaging apparatus of commands to perform various operations and make various settings and thereby can remotely control the imaging apparatus. Furthermore, a live view image captured by the imaging apparatus may be able to be received by the control apparatus through wired or wireless communication and displayed at the control apparatus.

According to the aspect of the embodiments, it is possible to improve usability for a user in a case where panoramic image capturing is performed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-090469, filed May 9, 2018, which is hereby incorporated by reference herein in its entirety.

What is claimed is:

1. An apparatus comprising:
at least one processor; and
At least one memory coupled to the at least one processor, the memory having instructions that, when executed by the processor, performs operations as:
a generation unit configured to generate a combined image obtained by combining an image captured in a case where an image capturing direction is moved in a first direction from a position of an image capturing start, and an image captured in a case where the image capturing direction is moved in a second direction opposite to the first direction with respect to the position of the image capturing start after the image is captured in the case where the image capturing direction is moved in the first direction; and
a control unit configured to perform control to, according to an amount of movement in the second direction from the position of the image capturing start having reached a second amount of movement that is an end condition for ending image capturing in the second direction, record the combined image obtained by the generation unit combining the image captured in the case where the image capturing direction is moved in the first direction and the image captured in the case where the image capturing direction is moved in the second direction in a recording medium,
wherein the second amount of movement that is the end condition for ending image capturing in the second direction is smaller as the amount of movement in the first direction is larger.

2. The apparatus according to claim 1, wherein the generation unit generates the combined image by combining a plurality of images obtained by a series of image capturing operations started by the image capturing start.

3. The apparatus according to claim 1, wherein the control unit ends image capturing in the first direction according to an amount of movement in the first direction having reached a first amount of movement that is an end condition for ending image capturing in the first direction, or an instruction to end image capturing having been received.

4. The apparatus according to claim 3, wherein a case where the amount of movement in the first direction reaches the first amount of movement is a case where an amount of acquisition of an image obtained by a series of image capturing operations started from the position of the image capturing start and performed by moving the image capturing direction in the first direction reaches a predetermined amount.

5. The apparatus according to claim 1, further comprising a display control unit configured to, based on an amount of movement in the first direction, display a movable amount corresponding to the second amount of movement in the second direction together with an image to be captured on a display unit.

6. An apparatus comprising:
at least one processor; and
at least one memory coupled to the at least one processor, the memory having instructions that, when executed by the processor, performs operations as:
a generation unit configured to generate a combined image obtained by combining an image captured in a case where an image capturing direction is moved in a first direction from an image capturing start, and an image captured in a case where the image capturing direction is moved in a second direction opposite to the first direction with respect to a position of the image capturing start; and
a display control unit configured to perform control to, based on an amount of movement in the first direction, perform display indicating a movable amount in the second direction by which an image used for an image to be combined can be captured,
wherein the display control unit performs control to perform display such that a greater the amount of movement in the first direction, a smaller the amount of movement in the second direction.

7. The apparatus according to claim 6, wherein the generation unit generates the combined image by combining a plurality of images obtained by a series of image capturing operations started by the image capturing start.

8. The apparatus according to claim 6, wherein the amount of movement in the first direction is acquired based on a plurality of images obtained by a series of image capturing operations started by the image capturing start and performed by moving the image capturing direction in the first direction.

9. The apparatus according to claim 6, wherein the display control unit performs control to, based on the movement in the first direction, update the display indicating the movable amount in the second direction.

10. The apparatus according to claim 6, wherein the display control unit performs, according to the movement in the first direction being turned back to the movement in the second direction, the display indicating the movable amount in the second direction.

11. The apparatus according to claim 6, wherein the display control unit performs, based on the amount of movement in the first direction, display indicating a movable amount in the first direction by which an image used for an image to be combined can be captured.

12. The apparatus according to claim 11, wherein the display control unit performs, on the same screen, the display indicating the movable amount in the second direction and the display indicating the movable amount in the first direction.

13. The apparatus according to claim 6, wherein the display control unit performs, in a case where the image capturing direction is moved in the second direction, display indicating an amount of movement in the second direction from the position of the image capturing start or a position where the movement is turned back in the second direction to a current time.

14. The apparatus according to claim 13, wherein the display control unit performs, in a case where the image capturing direction is moved in the first direction, display indicating an amount of movement in the first direction from the position of the image capturing start to the current time.

15. The apparatus according to claim 14, wherein the display control unit performs, in different forms, the display indicating the amount of movement in the first direction performed in a case where the image capturing direction is moved in the first direction, and the display indicating the amount of movement in the second direction performed in a case where the image capturing direction is moved in the second direction.

16. The apparatus according to claim 14, wherein the display control unit performs, in a case where the image capturing direction is moved in the second direction, and an image capturing position at the current time overlaps an image capturing position in a case where the image capturing direction is moved in the first direction, display such that it can be recognized that the image capturing positions are positions overlapping each other.

17. The apparatus according to claim 6, wherein the display control unit performs, based on the amount of movement in the first direction, display indicating a range where the movement in the second direction is impossible and an image used for an image to be combined cannot be captured.

18. The apparatus according to claim 17, wherein the display control unit performs, according to the movement in the first direction being turned back to the movement in the second direction, the display indicating the range where the movement in the second direction is impossible.

19. The apparatus according to claim 6, wherein the display control unit performs, based on an amount of movement in the second direction, display indicating a range where the movement in the first direction is impossible and an image used for an image to be combined cannot be captured.

20. The apparatus according to claim 6, wherein the display control unit performs, in a case where images having approximately equal lengths in the first and second directions with respect to the position of the image capturing start are combined, display indicating a position where the movement in the first direction is turned back to the movement in the second direction.

21. The apparatus according to claim 6, wherein the display control unit performs display indicating an entirety of an amount of movement in a case where an image used for an image to be combined is captured.

22. The apparatus according to claim 6, wherein the display control unit performs display indicating the position of the image capturing start.

23. A method for controlling an apparatus, the method comprising:
generating a combined image obtained by combining an image captured in a case where an image capturing direction is moved in a first direction from a position of an image capturing start, and an image captured in a case where the image capturing direction is moved in a second direction opposite to the first direction with respect to the position of the image capturing start after the image is captured in the case where the image capturing direction is moved in the first direction; and
performing, according to an amount of movement in the second direction from the position of the image capturing start having reached a second amount of movement that is an end condition for ending image capturing in the second direction, record of the combined image obtained by combining the image captured in the case where the image capturing direction is moved in the first direction and the image captured in the case where the image capturing direction is moved in the second direction in a recording medium,
wherein the second amount of movement that is the end condition for ending image capturing in the second direction is smaller as the amount of movement in the first direction is larger.

24. A method for controlling an apparatus, the method comprising:
generating a combined image obtained by combining an image captured in a case where an image capturing direction is moved in a first direction from an image capturing start, and an image captured in a case where the image capturing direction is moved in a second direction opposite to the first direction with respect to a position of the image capturing start; and
performing, based on an amount of movement in the first direction, display indicating a movable amount in the second direction by which an image used for an image to be combined can be captured,
wherein the display control unit performs control to perform display such that a greater the amount of movement in the first direction, a smaller the amount of movement in the second direction.

25. A non-transitory computer-readable recording medium that stores a program for causing a computer to function as:
a generation unit configured to generate a combined image obtained by combining an image captured in a case where an image capturing direction is moved in a first direction from a position of an image capturing start, and an image captured in a case where the image capturing direction is moved in a second direction opposite to the first direction with respect to the position of the image capturing start after the image is captured in the case where the image capturing direction is moved in the first direction; and a control unit configured to perform control to, according to an amount of movement in the second direction from the position of the image capturing start having reached a second amount of movement that is an end condition for ending image capturing in the second direction, record the combined image obtained by the generation unit combining the image captured in the case where the image capturing direction is moved in the first direction and the image captured in the case where the image capturing direction is moved in the second direction in a recording medium, wherein the second amount of movement that is the end condition for ending image capturing in the second direction is smaller as the amount of movement in the first direction is larger.

26. A non-transitory computer-readable recording medium that stores a program for causing a computer to function as:

a generation unit configured to generate a combined image obtained by combining an image captured in a case where an image capturing direction is moved in a first direction from an image capturing start, and an image captured in a case where the image capturing direction is moved in a second direction opposite to the first direction with respect to a position of the image capturing start; and a display control unit configured to perform control to, based on an amount of movement in the first direction, perform display indicating a movable amount in the second direction by which an image used for an image to be combined can be captured, wherein the display control unit performs control to perform display such that a greater the amount of movement in the first direction, a smaller the amount of movement in the second direction.

* * * * *